US010198718B2

(12) United States Patent
Rodoni

(10) Patent No.: US 10,198,718 B2
(45) Date of Patent: Feb. 5, 2019

(54) WASTE MANAGEMENT SYSTEM HAVING VENDOR OPPORTUNITY PLATFORM

(71) Applicant: Rubicon Global Holdings, LLC, Atlanta, GA (US)

(72) Inventor: Philip Rodoni, Decatur, GA (US)

(73) Assignee: RUBICON GLOBAL HOLDINGS, LLC, Atlanta, GA (US)

( * ) Notice: Subject to any disclaimer, the term of this patent is extended or adjusted under 35 U.S.C. 154(b) by 98 days.

(21) Appl. No.: 15/185,475

(22) Filed: Jun. 17, 2016

(65) Prior Publication Data
US 2017/0124533 A1    May 4, 2017

Related U.S. Application Data

(60) Provisional application No. 62/247,582, filed on Oct. 28, 2015, provisional application No. 62/306,277, filed on Mar. 10, 2016.

(51) Int. Cl.
*G06Q 10/00*    (2012.01)
*G06Q 30/06*    (2012.01)

(52) U.S. Cl.
CPC ......... *G06Q 10/30* (2013.01); *G06Q 30/0611* (2013.01); *Y02W 90/20* (2015.05)

(58) Field of Classification Search
CPC .................................................... G06Q 30/00
See application file for complete search history.

(56) References Cited

U.S. PATENT DOCUMENTS 6,216,108 B1 *  4/2001  LeVander ........ G06Q 10/06315
                                                    705/400
7,783,507 B2 *  8/2010  Schick ................ B61L 27/0094
                                                    705/7.11
(Continued)

FOREIGN PATENT DOCUMENTS

WO    WO 2014/079586 A1    5/2014

OTHER PUBLICATIONS

S. Abdelwahab, B. Hamdaoui, M. Guizani and A. Rayes, "Enabling Smart Cloud Services Through Remote Sensing: An Internet of Everything Enabler," in IEEE Internet of Things Journal, vol. 1, No. 3, pp. 276-288, Jun. 2014.doi: 10.1109/JIOT.2014.2325071 (Year: 2014).*

(Continued)

*Primary Examiner* — Resha Desai
*Assistant Examiner* — Michelle T Kringen
(74) *Attorney, Agent, or Firm* — Rock IP, PLLC

(57) ABSTRACT

A system is disclosed for managing waste. The system may have a first portal configured to receive input indicative of a customer service opportunity, a second portal configured to receive input indicative of a vendor's acceptance of the customer service opportunity, and a central processing unit in electronic communication with the first and second portals. The central processing unit may be configured to determine, from a list of registered vendors stored in memory, a shorter list of vendors capable of accommodating the customer service opportunity. The central processing unit may also be configured to offer the customer service opportunity to at least one vendor on the shorter list of vendors via the second portal, to receive an acceptance from the at least one vendor via the second portal to accommodate the customer service opportunity, and to automatically generate at least one contract based on the acceptance.

19 Claims, 20 Drawing Sheets

(56) References Cited

U.S. PATENT DOCUMENTS

| | | | |
|---|---|---|---|
| 2005/0261917 A1* | 11/2005 | Forget Shield | G06Q 10/047 705/39 |
| 2009/0070233 A1 | 3/2009 | Brunswig et al. | |
| 2009/0216612 A1 | 8/2009 | Pyle et al. | |
| 2012/0166310 A1* | 6/2012 | Werklund | G06Q 30/0613 705/26.41 |
| 2012/0173395 A1* | 7/2012 | Price | G06Q 10/06 705/30 |
| 2012/0330850 A1* | 12/2012 | Di Giugno | B65F 1/06 705/308 |
| 2013/0041832 A1 | 2/2013 | Rodatos | |
| 2013/0132233 A1 | 5/2013 | Rothley et al. | |
| 2014/0279429 A1 | 9/2014 | Holman et al. | |
| 2014/0379588 A1* | 12/2014 | Gates | G06Q 10/0631 705/308 |
| 2015/0036814 A1* | 2/2015 | Buckner | H04M 3/5183 379/265.09 |
| 2016/0300297 A1* | 10/2016 | Kekalainen | G06Q 10/08 |
| 2017/0220998 A1* | 8/2017 | Horn | G06Q 10/06311 |

OTHER PUBLICATIONS

PCT International Search Report and Written Opinion dated Oct. 4, 2016 (11 pages).

\* cited by examiner

FIG. 4

My Opp's

Home > Opp's > My Opp's

Outstanding Opp's

| Opp's ID | Location | | Service | Frequency | Status |
|---|---|---|---|---|---|
| 1 | 25 Taylor St, San Francisco, 94102 | GO | 8 ton | Daily | New |
| 2 | 1575 Filbert St, San Francisco - 95241 | GO | 4 ton | Weekly | 2 Responses |
| 3 | 21 Mission St, San Francisco - 94115 | GO | 2 ton | Monthly | No Responses |
| 1 | 25 Taylor St, San Francisco, 94102 | GO | 8 ton | Daily | New |
| 2 | 1575 Filbert St, San Francisco - 95241 | GO | 4 ton | Weekly | 2 Responses |
| 3 | 21 Mission St, San Francisco - 94115 | GO | 2 ton | Monthly | No Responses |

- RUBICON
- Dashboard
- Customers
- Vehicles
- Routes
- Opp's
- My Account

Home > Routes > Edit route

Edit route

Select date: [2015-07-29]  Select vehicle: [FL1]  Cancel

| Time | Customer | Options |
|---|---|---|
| 12:15 | Hampton Inn Perimeter Rd<br>Hampton Inn Atlanta-Perimeter Center, Hammond Drive Northeast, Atlanta, GA, United States | × |
| 14:30 | Rubicon Atlanta<br>Rubicon, Peachtree Dunwoody Road, Atlanta, GA, United States | × |
| 14:30 | Landfill Atlanta<br>Bolton Road Landfill, Atlanta, GA, United States | × |
| 16:00 | Wallmart Howell Mill<br>Wallmart Supercenter, Howell Mill Road Northwest, Atlanta, GA, United States | × |
| 20:00 | Wallmart Howell Mill<br>Wallmart Supercenter, Howell Mill Road Northwest, Atlanta, GA, United States | × |
| 22:45 | Landfill Atlanta<br>Bolton Road Landfill, Atlanta, GA, United States | × |
| [Select time] | [Select location] | Add |

Sidebar: RUBICON, Dashboard, Customers, Vehicles, Routes, Opp's, Settings, My Account 1700, 1710, 1712, 1714, 1716

1800

Stops Summary
Home > Routes > Stops Summary

| | Unassigned Stops | Scheduled Stops | Completed Stops | Problems/Reports |
|---|---|---|---|---|

| Vendor | Truck | Customer | | |
|---|---|---|---|---|
| North Metro | X1 | Walmart, 123 King St., Atlanta, GA | VIEW | REPORT |
| North Metro | X2 | 711, 123 Otto St., Atlanta, GA | VIEW | REPORT |
| North Metro | X3 | Citgo, 123 Queen St., Atlanta, GA | VIEW | REPORT |
| Atlas | A1 | Costco, 123 Andromeda St., Atlanta, GA | VIEW | REPORT |
| Atlas | A2 | Walmart, 123 King St., Atlanta, GA | VIEW | REPORT |
| North Metro | A3 | 711, 123 Otto St., Atlanta, GA | VIEW | REPORT |

1810

Sidebar: RUBICON — Dashboard — Customers — Vehicles — Routes — Opp's — My Account

FIG. 18

WASTE MANAGEMENT SYSTEM HAVING VENDOR OPPORTUNITY PLATFORM

RELATED APPLICATIONS

This application is based on and claims priority to U.S. Provisional Application Nos. 62/247,582 filed on Oct. 28, 2015; and 62/306,277 filed on Mar. 10, 2016, the contents of all of which are expressly incorporated herein by reference.

TECHNICAL FIELD

The present disclosure relates generally to a management system and, more particularly, to a waste management system having a vendor opportunity platform.

BACKGROUND

Waste removal has historically been handled in two general ways. In one example, an independent hauler having contracts with individual customers operates one or more vehicles to provide service within a localized area on a regular basis. While a cost of the service provided by the independent local hauler can be relatively low, service options provided by the local hauler can also be limited. In another example, a multi-regional operator employing fleets of vehicles retrieves waste from larger customers based on contracts for multiple service locations. The service options provided by the multi-regional operator can be broader than those provided by the independent operator, but these services may also be expensive and available to only particular customers in high-density locations.

Recently, waste management companies have emerged that combine the benefits of both the independent local haulers and the larger multi-regional operators. These companies consider the waste service needs of various customers, and select and manage a combination of local independent and multi-regional service providers to satisfy the service needs of those customers. Generally, the waste management companies select a particular service provider for each customer based directly on the service needs of the customer, a provider cost, a customer budget, or a service location. The selection process, however, is manually implemented and can be cumbersome, time-consuming, inefficient, and error-prone.

The disclosed system is directed to overcoming one or more of the problems set forth above and/or other problems of the prior art.

SUMMARY

In one aspect, the present disclosure is directed to a waste management system. The waste management system may include a first portal configured to receive input indicative of a customer service opportunity, a second portal configured to receive input indicative of a vendor's acceptance of the customer service opportunity, and a central processing unit in electronic communication with the first and second portals. The central processing unit may be configured to determine, from a list of registered vendors stored in memory, a shorter list of vendors capable of accommodating the customer service opportunity. The central processing unit may also be configured to offer the customer service opportunity to at least one vendor on the shorter list of vendors via the second portal, to receive an acceptance from the at least one vendor via the second portal to accommodate the customer service opportunity, and to automatically generate at least one contract based on the acceptance.

In another aspect, the present disclosure is directed to method for managing waste. The method may include electronically receiving a first input indicative of a customer service opportunity. The method may also include determining, from a list of registered vendors stored in memory, a shorter list of vendors capable of accommodating the customer service opportunity, and offering the customer service opportunity to at least one vendor on the shorter list of vendors. The method may further include receiving an electronic acceptance from the at least one vendor to accommodate the customer service opportunity, and automatically generating at least one contract based on the electronic acceptance.

In yet another aspect, the present disclosure is directed to a non-transitory computer readable medium containing computer-executable program instructions for performing a method of waste management. The method may include electronically receiving a first input indicative of a customer service opportunity. The method may also include determining, from a list of registered vendors stored in memory, a shorter list of vendors capable of accommodating the customer service opportunity; ranking the vendors on the shorter list based on at least one of a past performance, a capability, and a vendor relationship; and offering the customer service opportunity to at least one vendor on the shorter list of vendors based on the ranking. The method may further include receiving an electronic acceptance from the at least one vendor to accommodate the customer service opportunity, and automatically generating at least one contract based on the electronic acceptance.

BRIEF DESCRIPTION OF THE DRAWINGS

FIGS. 4-18 are diagrammatic illustrations of exemplary disclosed graphical user interfaces that may be used to access the system of FIG. 2.

DETAILED DESCRIPTION

Figure 1:
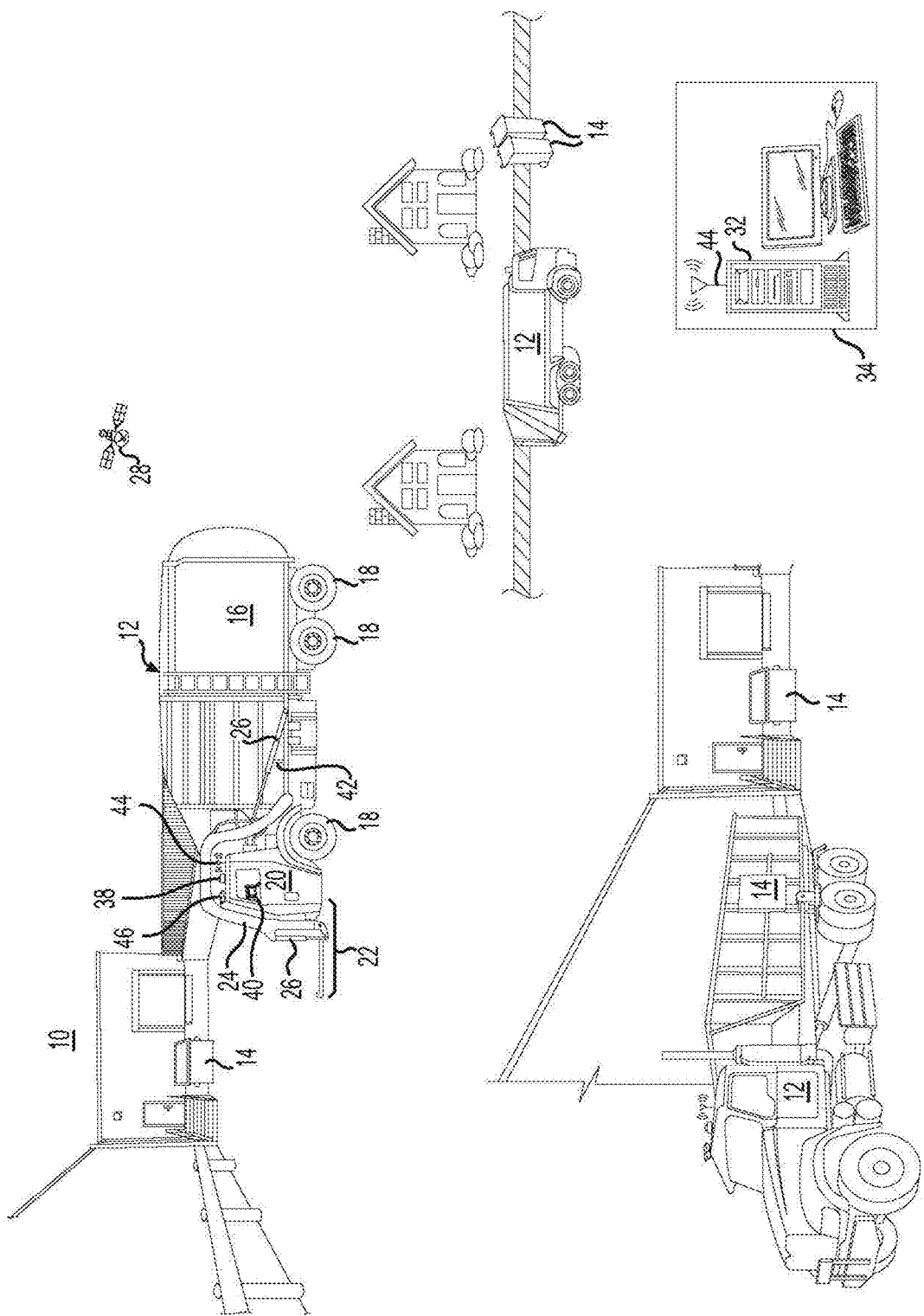
FIG. 1 is an isometric illustration of an exemplary disclosed waste management environment.

FIG. 1 illustrates an exemplary waste management environment ("environment") 10, at which multiple vehicles 12 are providing service for multiple different customers. Environment 10 may include a retail store, a factory, a government building, a residential address, and/or another location having one or more receptacles 14 that require the services of vehicles 12. The services may include, for example, the removal of waste materials from inside of receptacle(s) 14, the replacement of receptacle(s) 14, and/or the placement of additional receptacles 14.

Vehicles 12 may take many different forms. In the upper left example of FIG. 1, vehicle 12 is a hydraulically actuated, front-loading type of vehicle. Specifically, vehicle 12 may include a bed 16 supported by a plurality of wheels 18, a cab 20 located forward of bed 16, and a lifting device 22 extending forward of cab 20. Lifting device 22 may consist of, among other things, one or more lift arms 24 configured to engage and/or grasp receptacle 14, and one or more actuators 26 powered by pressurized oil to raise lift arms 24

(and receptacle 14) up past cab 20 to a dump location over bed 16. After dumping receptacle 14, pressurized oil may be released from hydraulic actuator(s) 26 to allow lowering of lift arms 24 and receptacle 14 back to the ground in front of vehicle 12.

In other examples (e.g., shown on the right in FIG. 1), vehicle 12 may be located to pick up receptacles 14 from a side and/or a rear of each vehicle 12. In yet other examples (not shown), receptacles 14 may be manually lifted and dumped into bed 16. In a final example, (e.g., shown in lower left of FIG. 1), vehicle 12 may be configured to load receptacle 14 onto vehicle 12 for transportation away from environment 10. In any of these examples, bed 16 could be outfitted with a compactor (not shown) to compact the waste material after the material is dumped into bed 16, and/or a door (not shown) configured to close an opening of bed 16 through which the waste material is dumped. Other configurations may also be possible.

As each vehicle 12 moves about environment 10, a satellite 28 or other tracking device may communicate with an onboard controller 30 (shown only in FIG. 2) to monitor the movements of vehicle 12 and the associated changes made to environment 10 (e.g., pickup, dumping, placement, etc.). As will be explained in more detail below, onboard controller 30 may network with a central processing unit ("CPU") 32 (e.g., a processing unit located in a back office 34 or other service facility), which may then manage future operations of each vehicle 12 based on these movements and changes.

Onboard controller 30 may include means for monitoring, recording, storing, indexing, processing, communicating and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Onboard controller 30 may be configured to track, assist, and/or control movements of the associated vehicle(s) 12. In addition to onboard controller 30, each vehicle 12 could additionally include a locating device 38, and at least one of a manual input device 40 and a sensor 42 mounted or otherwise located onboard each vehicle 12. In some embodiments, vehicle 12 is equipped with both manual input device 40 and one or more sensors 42. Onboard controller 30 may be in communication with each of these other components and/or with CPU 32 at back office 34 (e.g., via a communication device 44), and configured to determine, based on signals from these components and based on other known information stored in memory, the location of each vehicle 12, and characteristics and locations of receptacles 14 being moved by and/or in a vicinity of each vehicle 12.

Locating device 38 may be configured to generate signals indicative of a geographical position and/or orientation of vehicle 12 relative to a local reference point, a coordinate system associated with environment 10, a coordinate system associated with Earth, or any other type of 2-D or 3-D coordinate system. For example, locating device 38 may embody an electronic receiver configured to communicate with satellites 28, or a local radio or laser transmitting system used to determine a relative geographical location of itself. Locating device 38 may receive and analyze high-frequency, low-power radio or laser signals from multiple locations to triangulate a relative 3-D geographical position and orientation. In some embodiments, locating device 38 may also be configured to determine a location and/or orientation of a particular part of vehicle 12, for example of lift arms 24. Based on the signals generated by locating device 38 and based on known kinematics of vehicle 12, onboard controller 30 may be able to determine in real time the position, heading, travel speed, acceleration, and orientation of vehicle 12 and lift arms 24. This information may then be used by onboard controller 30 and/or CPU 32 to update the locations and conditions of vehicles 12 and/or receptacles 14 in an electronic map or database of environment 10.

Input device 40 may provide a way for an operator of vehicle 12 to input information regarding observances made while traveling around environment 10. For example, the operator may be able to enter a type and/or condition of waste observed at a particular location, an amount of waste in or around receptacle 14, a fill status of a particular receptacle 14, a condition of receptacle 14, a location of receptacle 14, and or other information about receptacle 14 and waste engaged by, loaded into, or otherwise processed by vehicle 12. The information may be input in any number of ways, for example via a cab-mounted touch screen interface, via one or more buttons, via a keyboard, via speech recognition, via a smartphone carried by the operator, or in another manner known in the art. In some embodiments, in addition to receiving manual input from an operator, input device 40 may also be capable of displaying information, for example the electronic map of environment 10, instructions from back office 34, payload information, cycle count, etc.

Sensors 42 may be configured to monitor parameters associated with the waste material loaded into vehicle 12 and/or the associated receptacle(s) 14 being moved by vehicle 12 (e.g., moved by lift arms 24), and to generate corresponding signals indicative thereof. Each of these sensors 42 may be any type of device known in the art, and located anywhere on vehicle 12. In one example, sensor 42 may embody any one or more of a load cell, a force gauge, a pressure sensor, or another type of load detector associated directly with lift arms 24, with actuator(s) 26, and/or with a strut or other structure supporting bed 16. In this example, the signals generated by sensor(s) 42 may correspond with strain on lift arms 24, with a force applied to lift arms 24 by actuator(s) 26, and or with a payload weight of bed 16.

Alternatively, one or more sensors 42 may be associated with a power source or drivetrain of vehicle 12, and configured to generate signals indicative of an amount of power used to propel vehicle 12, to drive the hydraulics of actuators 26, to move the in-bed compactor, or to shut the associated door. Other types of sensors 42 (e.g., cameras, spectrometers, IR sensors, RADAR sensors, LIDAR sensors, etc.) may also be utilized to determine characteristics (e.g., load profile, volume, and/or shape) of the waste material inside receptacles 14 or of receptacles 14 themselves. In yet further examples, sensor 42 could be an acoustic sensor, an accelerometer, or another similar type of sensor configured to detect engagement conditions and/or cycle completion of lift arms 24, the in-bed compactor, the door, etc. during lifting, dumping, and/or shaking of receptacle 14. Other types of sensors 42 may alternatively or additionally be utilized. Signals generated by these sensors 42 may be communicated to onboard controller 30, which may use the signals to determine the conditions surrounding receptacles 14 (and/or the waste inside receptacles 14) during servicing by vehicle 12.

Onboard controller 30 may be configured to manage communications between other onboard components and CPU 32 located at back office 34. For example, onboard controller 30 may receive signals from locating device 38, input device(s) 40, and sensors 42, and correlate the signals, filter the signals, buffer the signals, record the signals, or otherwise condition the signals before directing the signals offboard via communication device 44.

Communication device 44 may be configured to facilitate communication between onboard controller 30 and offboard CPU 32. Communication device 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and CPU 32 may communicate directly with locating device 38, input device(s) 40, and/or sensor(s) 42 via communication device 44, if desired. Other means of communication may also be possible.

Figure 2:
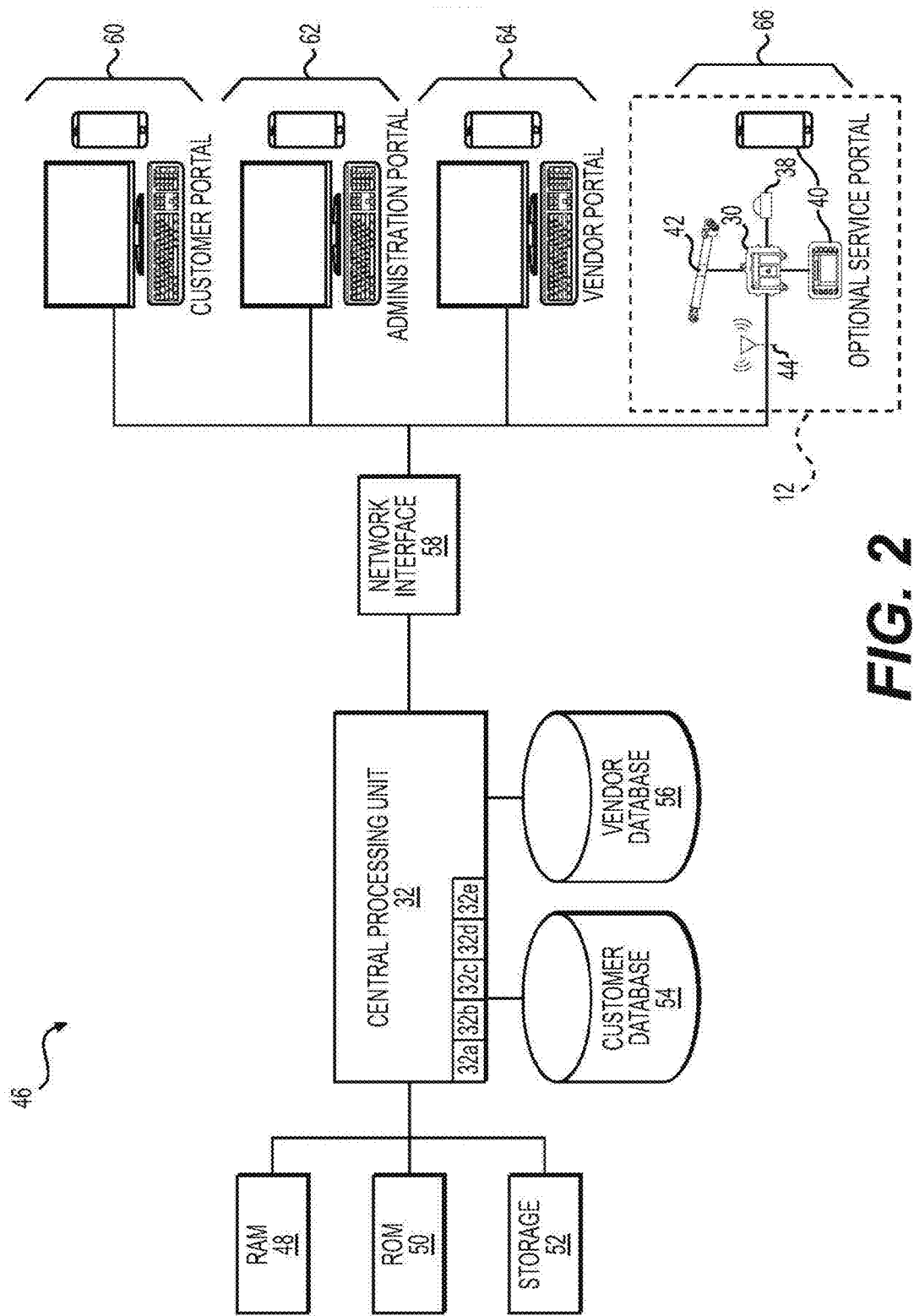
FIG. 2 is a diagrammatic illustration of an exemplary disclosed system that may be used to manage the environment of FIG. 1.

As shown in FIG. 2, onboard controller 30 (and the other connected onboard components) and CPU 32 may each form a portion of a waste management system ("system") 46 configured to generate, maintain, send, solicit, confirm, display, receive and/or record information associated with the disclosed concepts. System 46 may include, for example, a random access memory (RAM) 48, a read-only memory (ROM) 50, a storage 52, at least one database (e.g., a customer database 54 and vendor database 56), a network interface 58, and at least one user portal (e.g., a customer portal 60, an administration portal 62, a vendor portal 64, and an optional service portal 66). As will be explained in more detail below, CPU 32 may be configured to receive data from different users via portals 60-66, and to record, process, and share the data with the same and/or with other users via the same or different portals 60-66. It is contemplated that system 46 may include additional, fewer, and/or different components than those listed above. It is understood that the type and number of listed devices are exemplary only and not intended to be limiting.

CPU 32 may include an arrangement of electronic circuitry configured to perform arithmetic, logic, input/output, and control operations during sequential execution of pre-programmed instructions. The instructions may be loaded from ROM 50 into RAM 48 for execution by CPU 32. It should be noted that, although CPU 32 is shown and described as a single "unit", it is contemplated that the functions of CPU 32 could alternatively be completed by any number of co-located or remotely distributed and cooperating processing units, as desired. Numerous commercially available microprocessors may be configured to perform the functions of CPU 32. Further, the microprocessors may be general-purpose processors or specially constructed for use in implementing the disclosed concepts.

The functions of CPU 32 may be divided among any number of different modules. In the disclosed embodiment, these modules include an opportunity module 32a, a rating module 32b, a services module 32c, a pricing module 32d, and an administration module 32e. In general, the word "module," as used herein, refers to a collection of software instructions (e.g., instructions that are compiled and linked into an executable program) or embedded firmware that performs the same function. It will be appreciated that some modules could be callable from other modules or from themselves, and/or can be invoked in response to detected events or interrupts. Modules 32a-e, if embodied as software, may be configured for execution by CPU 32 and provided on a computer readable medium, such as a compact disc, digital video disc, flash drive, magnetic disc, or any other tangible medium, or as a digital download (and can be originally stored in a compressed or installable format that requires installation, decompression, or decryption prior to execution).

Storage 52 may embody any appropriate type of mass storage provided to hold information that CPU 32 may need in order to perform the disclosed processes. For example, storage 52 may include one or more hard disk devices, optical disk devices, or other storage devices that provide sufficient storage space.

Databases 54 and/or 56 may contain model data and any information relating to particular customer and vendor records under analysis. The information stored within databases 54 and/or 56 may come from any source known in the art and be provided at any time and frequency. For example, the information could be manually entered based on recorded statistics and/or live observations, automatically retrieved from an external server based on a predetermined schedule, continuously streamed from a customer or vendor site, spontaneously uploaded by users via portals 60-66, intermittently pulled from "the cloud," or obtained in any other manner at any other time and frequency. In addition to the customer and vendor information, databases 54 and/or 56 may also include tools for analyzing the information stored therein. CPU 32 may use databases 54 and/or 56 to determine relationships and/or trends relating to particular customers, vendors, and/or users of system 46, and other such pieces of information. CPU 32 may pull information from databases 54 and/or 56, manipulate the information, and analyze the information. CPU 32 may also update the information, store new information, and store analysis results within databases 54 and/or 56, as desired.

CPU 32 may communicate with a user of system 46 (e.g., a user accessing any one of portals 60-66) via network interface 58. Network interface 58 may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components. For example, the communication links may include non-proprietary links and protocols, or proprietary links and protocols based on known industry standards, such as J1939, RS-234, RP1210, RS-422, RS-485, MODBUS, CAN, SAEJ1587, Bluetooth, the Internet, an intranet, 802.11 (b, g, n, ac, or ad), or any other communication links and/or protocols known in the art.

Each of portals 60-66 can include one or more of a router, an Ethernet bridge, a modem (e.g., a wired or wireless modem), or any other conventional computing components known in the art (not shown) such as a processor, input/output (I/O) ports, a storage, and a memory. The processor of each portal 60-66 can include one or more processing devices, such as microprocessors and/or embedded controllers. The storage can include volatile or non-volatile, magnetic, semiconductor, tape, optical, removable, non-removable, or other type of computer-readable medium or computer-readable storage device. The storage can be configured to store software programs (e.g., apps) downloaded from CPU 32 via network interface 58 and/or other information that can be used to implement one or more of the disclosed processes. The memory can include one or more storage devices configured to store the downloaded information. Each of portals 60-66 may be able to communicate with CPU 32, with databases 54 and/or 56, and/or directly with another of portals 60-66 via network interface 58.

Each of portals 60-66 may provide a graphical user interface (GUI) that is configured to display information to users thereof, and that includes a means for receiving input from the user. In one embodiment, an exemplary portal is a computer (e.g., a laptop or desktop computer) having a console and a keyboard/mouse. In another embodiment, an exemplary portal is a handheld mobile device, such as a smart phone or a tablet having a touchscreen display and/or a keyboard. Other types of portals may also be utilized. The GUIs of portals 60-66 may allow the user to receive (e.g., visually and/or audibly) information from system 46 via network interface 58, to upload information to system 46, and/or to correspond with other users of system 46.

Portal 60 may be dedicated for use by a customer (e.g., an existing customer already having a particular account or contract with the provider of system 46 or a new customer desiring to establish such an account or contract). It is contemplated that any number of portals 60 may be simultaneously connected to network interface 58 for use by any number of different customers. Each such portal 60 may allow a customer to log into system 46 (e.g., via a web-based program, an internet site, or a mobile app) and to request, modify, and/or cancel a waste removal service. The request for waste removal services input via portal 60 may include among other things, an indication as to how much waste (e.g., volume, weight, receptacle size, etc.) should be removed, a type of the waste (e.g., recyclables, organic, hazardous, etc.), when the waste should be removed (e.g., frequency, particular days or dates, times of day, etc.), how the waste should be removed (e.g., travel routes, access gates, cleanliness requirements, etc.), and/or how much the customer is willing to pay for the waste removal service. Other types of information may also be input by the customer, if desired.

Portal 60 may also provide the customer with information regarding past and/or future removal services, if desired. This information could include confirmation of a request being received and/or accepted, cost quoting for service, confirmation of a service being provided, and/or billing for completed services. In some embodiments, portal 60 may be capable of providing live or near-live feedback (e.g., GPS tracking, lift-arm tracking, and/or live onboard video feed) during servicing, if desired. Other forms of information could also be provided to the customer via portal 60.

Administration portal 62 may be dedicated for use by an administrator of system 46 (e.g., an account representative, a sales associate, a service manager, an IT manger, etc.). It is contemplated that any number of portals 62 may be simultaneously connected to network interface 58 for use by any number of different administrators associated with the same or different accounts. Each such portal 62 may allow the administrator to log into system 46 (e.g., via a web-based program, an internet site, or a mobile app) and to address a service request, to address and/or monitor a service event, to manage a particular customer account, to create new customer accounts, to solicit services from existing vendors, to generate contracts between particular customers and vendors, to create new vendor accounts, to manage existing service contracts, to initiate billing, to rank customers and vendors, and/or for other similar purposes.

Vendor portal 64 may be dedicated for use by a vendor (i.e., a provider of waste removal services) of system 46. It is contemplated that any number of portals 64 may be simultaneously connected to network interface 58 for use by any number of different vendors associated with the same or different accounts. Each such portal 64 may allow the vendor to log into system 46 (e.g., via a web-based program, an internet site, or a mobile app) and to view existing contracts awarded to the particular vendor, to view and respond to open opportunities for contracts, to request and/or provide information regarding past and open contracts or opportunities, to monitor live or near-live service events, to submit invoices for completed services, and for other purposes.

Service portal 66 may be an optional portal included in some embodiments of system 46 and dedicated to the input of information generated by devices located onboard vehicles 12. In some examples, the information is automatically provided by way of location device 38 and sensors 42. In other examples, the information is manually provided by way of input device(s) 40. The information may include, for example, the location of each vehicle 12, a travel path, a schedule of stops, a status of a particular service event (e.g., if the service has been started, is ongoing, has been completed, or is problematic), and other information. It is contemplated that the functionality of service portal 66 could alternatively be provided by way of vendor portal 64 (or another portal), if desired.

Figure 3:
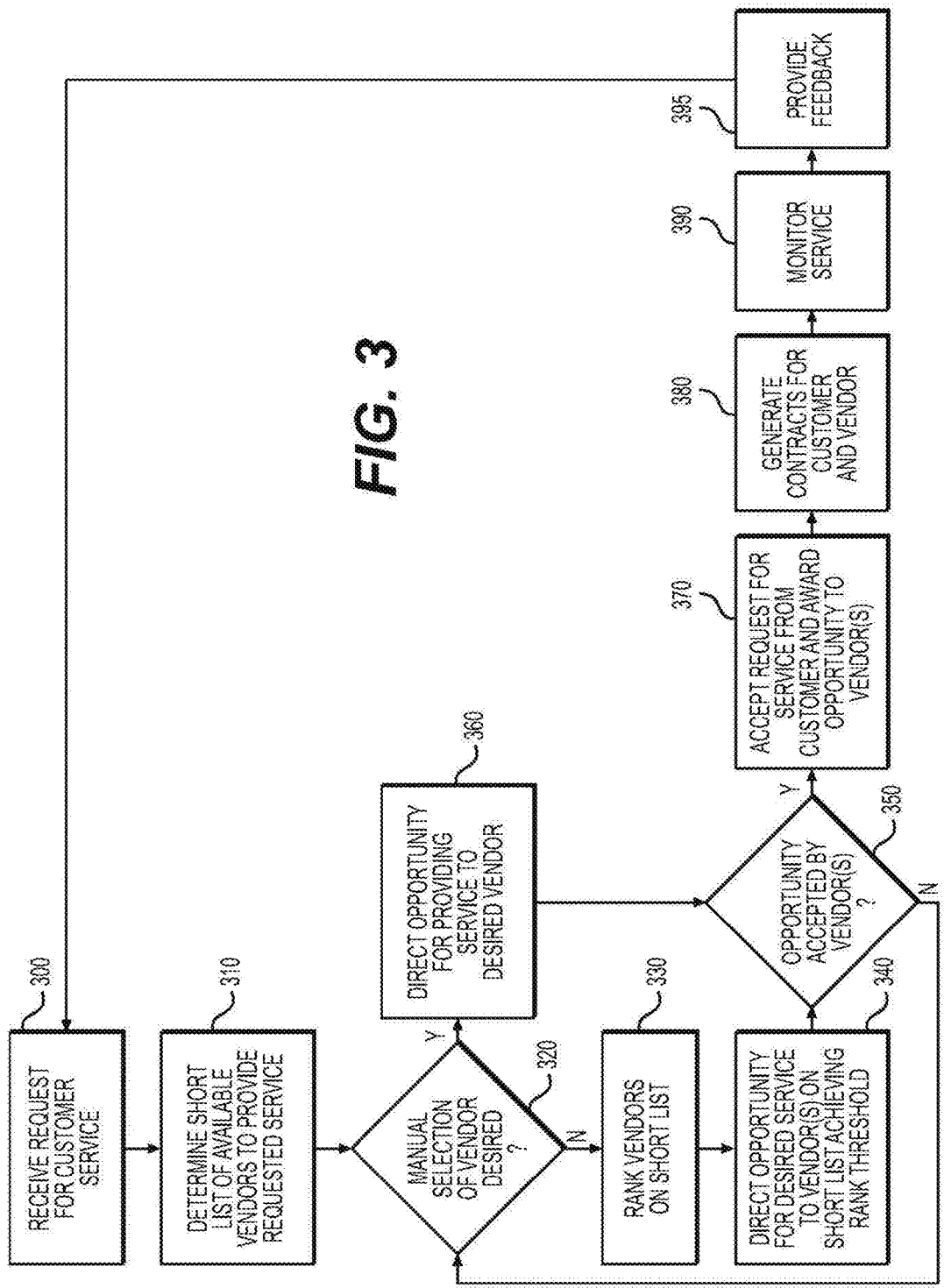
FIG. 3 is a flowchart depicting an exemplary disclosed method that may be performed by the system of FIG. 2.
Figure 6:
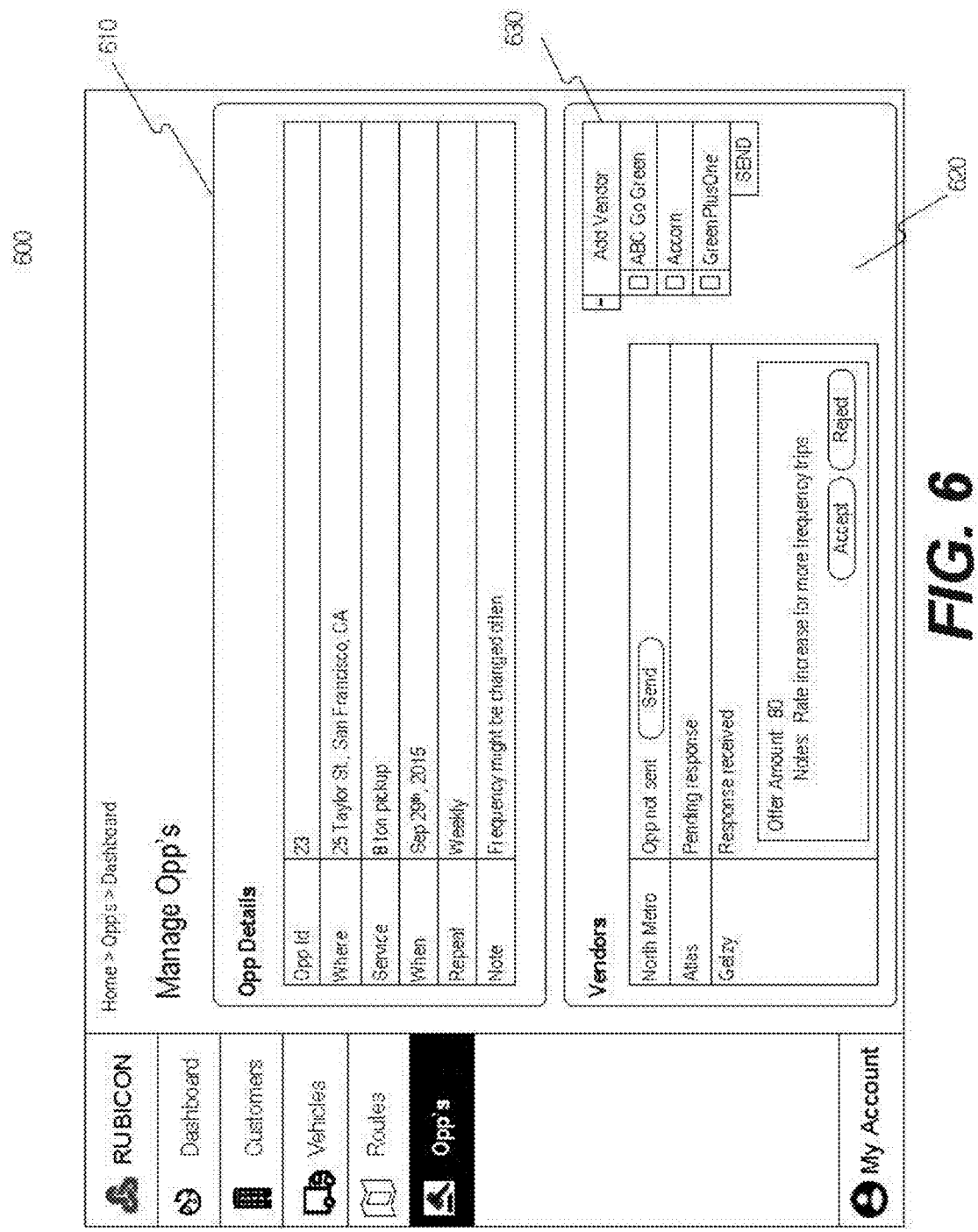

Based on the information received from devices located onboard vehicles 12 and also based from information received from portals 60-66, CPU 32 can be configured to execute instructions stored on computer readable medium to perform methods of waste management at environment 10. For example, CPU 32 may be configured to determine a particular service need for a particular customer, to arrange for a particular vendor to provide the required service, to monitor the service as it is being performed, and to provide feedback (e.g., billing, customer ranking, vendor ranking, etc.) based on the monitored service, vendor interaction, and customer interaction. This process is illustrated in FIG. 3, and will be explained in more detail in the following section to further illustrate the disclosed concepts.

FIGS. 4-20 represent exemplary Graphical User Interfaces (GUIs) that may be shown on any one or more of portals 60-66. FIGS. 4-20 will be discussed in greater detail below to further illustrate the disclosed concepts.

INDUSTRIAL APPLICABILITY

The disclosed system may be applicable to the waste service industry, where numerous waste receptacles 14 are distributed across multiple locations, each having varying service requirements. The disclosed system may consider customer information and need, as well as vendor information and capabilities, in order to generate specific customer/vendor relationships that accommodate the needs in a desired way. Operation of system 36 will now be described with reference to FIG. 3.

As shown in FIG. 3, operation of system 36 may begin with a request for service being received (Step 300). In the disclosed embodiment, the request is received via portal 60, and may be from a customer already having an established account or from a new customer. The request, in this example, could be input to portal 60 via a web browser, via a smartphone app, or in another manner. The request may include, among other things, a request for a certain amount (e.g., volume, weight, receptacle size, etc.) and/or type of waste (e.g., recyclable, standard, hazardous, etc.) to be removed from a specific customer location on a particular date, on a particular day, and/or at a particular time of day. The request may be an on-demand request or a request for continuing service at a given frequency. The request may also include information about how to access the customer's location and/or site of receptacle 14, and/or a budget allotted for the service. In some embodiments, only the request for service may be input by the customer via portal 60, while the remaining information may be retrieved from database 20 and/or from another source. In addition to requesting a new service, adjustments and/or cancellations can also be made to an existing account at this time.

Once the request for service from the customer has been received and the associated information input via portal 60 or otherwise retrieved from database 20, CPU 32 may process the request to find one or more vendors suitable to accommodate the request. For example, CPU 32 may determine a short list of vendors from a larger listing of registered vendors contained in database 56 (Step 310). The short list may be determined by applying one or more filters (e.g., geographical filters, equipment filters, calendar filters, pricing filters, etc.) to the larger listing of registered vendors.

CPU 32 may then determine if manual selection of a particular vendor from the short list of vendors is desired for awarding of the service opportunity (Step 320). That is, in some instances, an administrator of system 46 may have a preferred service provider for a particular geographical region, for particular customer requirements, for particular on-demand requests, or for other purposes. In these instances, CPU 32 may allow for the manual selection of a particular vendor from the short list of vendors for awarding of the "opportunity" to serve (i.e., to provide waste services to) a particular customer. When manual selection is not desired (Step 320:N), CPU 32 may be configured to rank the vendors on the short list accordingly to a pre-determined set of rules (Step 330). The vendors could be ranked, for example, based on past performance (e.g., customer satisfaction, responsiveness, cleanliness, reliability, cost, damage claims, etc.), capability (e.g., equipment functionality, capacity, and/or availability; proximity; manpower, etc.), and/or vendor relationship (e.g., opportunity responsiveness, service interruptions, contract compliance, insurance, financial obligations, or other strategic relationships).

Once the short list of vendors has been ranked, CPU 32 may be configured to direct an opportunity to service the customer's request received at step 300 to one or more vendors on the short list according to the ranking (Step 340). In one embodiment, the opportunity is directed to only one vendor at a time, starting with a highest ranked vendor. In another embodiment, the opportunity is directed to multiple vendors at the same time, each of the vendors receiving the opportunity having achieved a ranking of at least a minimum threshold. Other strategies may also be employed when directing the opportunity to vendors, as desired. The opportunity may be directed to the vendor(s) via vendor portal 64, via an email, via a text, via a phone call, or in any other manner known in the art. In some embodiments, the opportunity communication may include a link, allowing the vendor to access additional information regarding the opportunity. The opportunity may be communicated along with a time window in which the vendor must reply in order to be considered for the opportunity.

Once the opportunity to service the customer has been extended to one or more vendors, the vendor(s) may be allowed to respond to the opportunity (e.g., via vendor portal 64). The response could include acceptance of the opportunity as-defined by the customer and/or administrator (e.g., at a set rate), a rate quoted specifically for the opportunity, submission of special conditions under which the vendor can provide the service, a request for more information, and/or a rejection of the opportunity. CPU 32 may receive the vendor response and determine based on the response (or lack of response within the given time window), if the opportunity has been accepted (Step 350). When the vendor (s) having received the opportunity respond with a rejection (or if no vendors respond within the given time window), control may then return to step 320 where manual selection or automatic selection of a new or next vendor on the short list may be made.

Returning to step 320, when manual selection of the vendor(s) is desired, CPU 32 may bypass steps 330 and 340, and immediately direct the opportunity to the selected vendor(s) (Step 360). Control may then proceed from step 360 to step 350.

When CPU 32 determines at step 350 that the opportunity has been accepted by one or more vendors, CPU 32 may then accept the customer's request for service and also award the opportunity to one or more of the accepting vendors (Step 370). In other words, the customer request for service receive at step 300 may not necessarily be accepted. In some situations, the customer request may only be accepted after a vendor has agreed to provide the associated service. This may help to avoid a situation where a customer requests a service that cannot be provided by available vendors.

In some embodiments, CPU 32 may have to apply a set of rules to the accepting vendors so as to pick one (or more) of the vendors for the award (i.e., for the right to provide waste services to the particular customer). The rules could be associated with an amount of time taken for the vendor to respond, a quoted rate of the vendor, the ranking of the vendors previously generated, or other factors. After award of the opportunity to one or more vendors, CPU 32 may automatically generate contracts between the customer and the provider of system 46, between the provider and the vendor, and/or between the customer and the vendor (Step 380). Vendors that are not awarded the opportunity may be provided with a corresponding notice that the opportunity is closed, along with reasons in some situations, for the lost opportunity.

It is contemplated that, in some situations, a particular opportunity to service a particular customer may not be accepted by any vendor on the short list. For example, the location of the customer could be too remote, the fee associated with the service could be too low, and/or the service may require vendor equipment that is currently unavailable. In these situations, an administrator may be able to negotiate with the customer and/or the vendor (e.g., via administration portal 62) to adjust the terms of the service. In some situations, the negotiation could be automatically implemented by CPU 32, if desired.

Once an opportunity has been accepted by and awarded to one or more vendors, CPU 32 may then monitor the corresponding service provided by the awarded vendor(s) (Step 390) and provide feedback regarding the service (Step 395). Service monitoring may be provided in many different ways. In a first instance, the monitoring may be automatically provided, for example by way of input (e.g., GPS information, sensor information, manually input information, etc.) generated onboard vehicle 12 during the service (e.g., via service portal 68). In a second instance, the monitoring may be manually provided by the customer and/or the vendor (e.g., via customer portal 60 and/or vendor portal 64). The feedback may include a date, day, and/or time when vehicle 12 arrived at the customer location; a day, date, and/or time when receptacle 14 was lifted, shaken, or otherwise emptied; a weight of the waste removed from receptacle 14; notes regarding receptacle placement, receptacle condition, site cleanliness, traffic congestion, etc.; billing information; payment information; and other types of information. The feedback may also include ranking of the customer (e.g., by the provider) and/or provider (e.g., by the customer) based on the other feedback information. The feedback may be provided in real time and/or stored within a library of databases 54 and/or 56 for subsequent retrieval via portals 60 and/or 64.

It is contemplated that, once an opportunity has been awarded to one or more vendors, CPU 32 may be configured to provide additional services to the vendor(s). For example, CPU 32 may be able to help with travel directions to the customer location (e.g., by way of electronic maps pushed to vendor portal 66), to help with scheduling (e.g., by arranging the new customer stop with other known stops made by the same vendor on the same day), to help with landfill arrangements, or to help in other ways known in the art.

Figure 4:
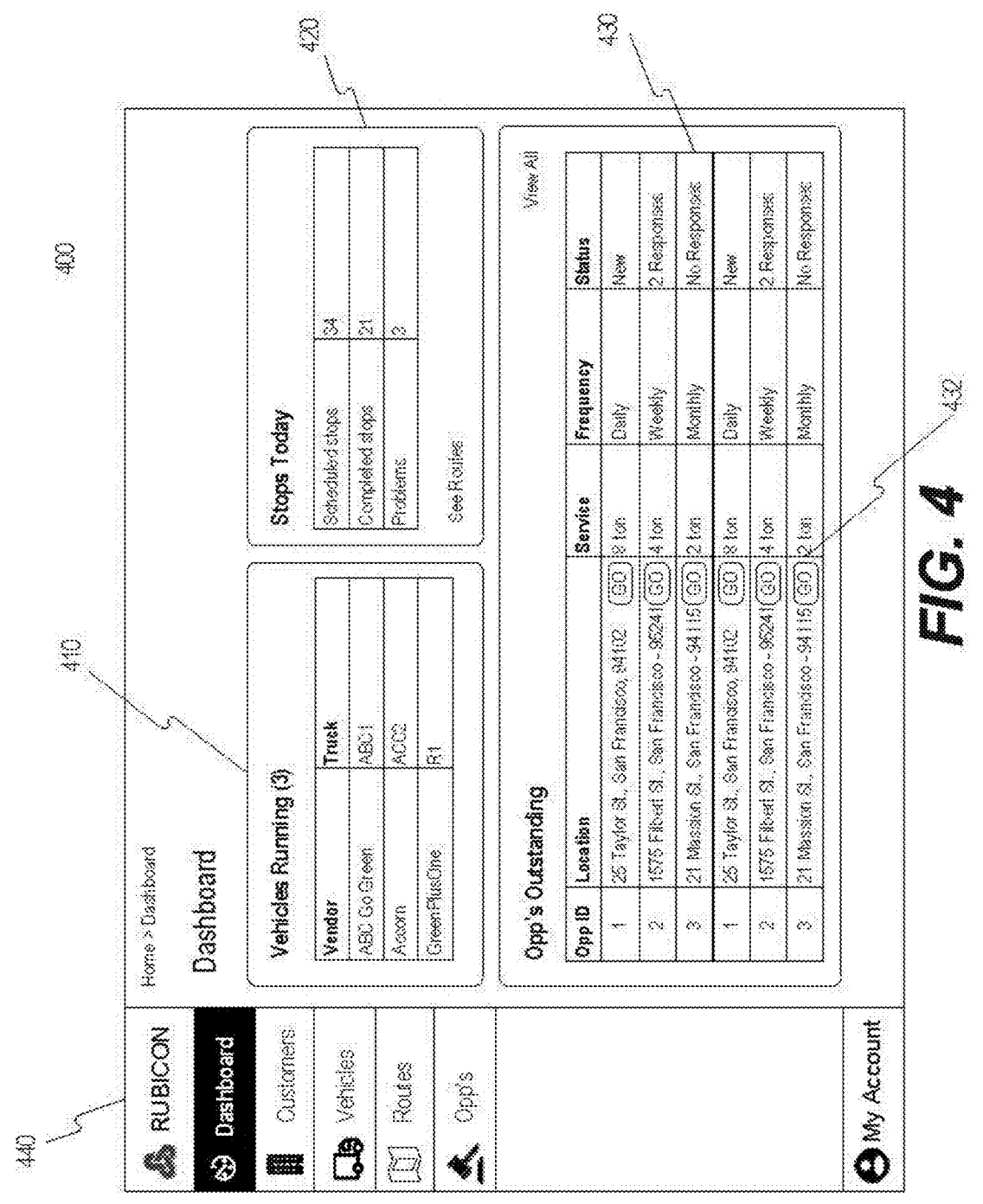

FIG. 4 shows an exemplary GUI 400 of the disclosed administration portal 66 having multiple information windows that can be managed by an administrator of system 46. For example, GUI 400 includes a first window area 410 providing a listing of vehicles 12 running for the current period of time, and an indication as to the particular vendor that owns vehicles 12. In some embodiments, each of the vendor and vehicle identifiers may be selectable to access additional information specific to the selected vendor or vehicle 12. In some embodiments, selection of the vendor or vehicle identifier may enable a visual display of a real-time location of vehicles 12 overlapped with a geographic map. GUI 400 also includes a second window area 420 displaying a total number of scheduled stops for the day, the number of completed stops and whether any issues have been detected or reported. Any of these data identifiers may also be selectable to access additional information concerning the particular problems or the scheduled stops. GUI 400 also includes a third window area 430 displaying a number of outstanding service opportunities, along with information regarding the opportunities (e.g., the nature of the requested service, the frequency of the service, and the current status of the opportunity). Additional information may be accessed for any particular listed opportunity by selecting the opportunity listing itself or by pushing a selectable button such as a "GO" button 432 associated with each opportunity. GUI 400 also includes a left-handed menu bar having a number of selectable options that provide additional detailed information about customers, vehicles 12, routes, or opportunities ("Opp's").

While the GUI 400 illustrates an exemplary administrator's view of available information that can be shown on administration portal 62 of system 46, a similar GUI 400 may be shown on each of customer and vendor portals 60 and 64. For example, window area 410 of GUI 400 may be tailored for a particular vendor, enabling the vendor to access information associated with each vehicle 12 owned by only that particular vendor. The vendor may also be able to similarly view in window area 420 each scheduled stop for a particular one of its vehicles 12, and in window area 430 each of the opportunities presented to the vendor. Similarly, a customer can be provided with customer-specific information via GUI 400 on customer portal 60 (e.g., information enabling the customer to access information pertaining to the vehicles 12 servicing its locations, scheduled stops at its locations, and outstanding service requests).

FIG. 5 illustrates an exemplary GUI 500 that can be shown on any of the available portals 60-66. In the example of FIG. 5, GUI 500 is specifically intended for vendor portal 64 and includes a secondary view of the outstanding opportunities pertaining to a particular vendor. GUI 500 may be accessed, for example, by selecting the "Opp's" menu item of the window area 440 provided in GUI 400 (referring to FIG. 4). GUI 500 includes a window area 530, similar to window area 430 of FIG. 4, displaying details of a multiple outstanding opportunities. According to the exemplary embodiments, the outstanding opportunities represent customer service requests received by system 46 via portal 60. When GUI 500 is displayed within customer portal 60, window area 530 may represent the outstanding opportunities requested by the same customer. As similarly described with respect to FIG. 4, any of the displayed opportunities may be selectable to access additional information concerning the opportunities and to manage the opportunities. Such additional information and functionality may be provided by an exemplary GUI 600, shown in FIG. 6.

GUI 600 may provide a window area 610 showing specific details of a selected opportunity. The specific details may include, among other things, the location of the requested service, the nature of the service, a date of the requested service, a frequency of the requested service, and any other notes associated with the service. GUI 600 may also include a vendor information window area 620, which displays information concerning vendors offered the opportunity and a status of the opportunity. For example, three different vendors are listed in window area 620, each with a different status identifier. "North Metro", for example, has not yet been presented with the opportunity, whereas the system is awaiting a response from "Atlas", and "Getzy" has provided a rate quote for the presented opportunity. In this example, GUI 600 is an administrator's view, allowing the administrator to "Accept" or "Reject" the received rate quote presented by "Getzy", for example by selecting either of the displayed buttons. Additionally, the administrator may be enabled to send or present the opportunity to vendor "North Metro" by selecting an associated "Send" button. The vendors illustrated in window area 620 may be vendors automatically put onto the short list descried above (e.g., vendors identified as being within the same geographical location as the opportunity). Other vendors may be manually added to the short list by the administrator, by selecting the vendors from a drop-down menu list, such as shown in a window area 630 of GUI 600.

Figure 7A:
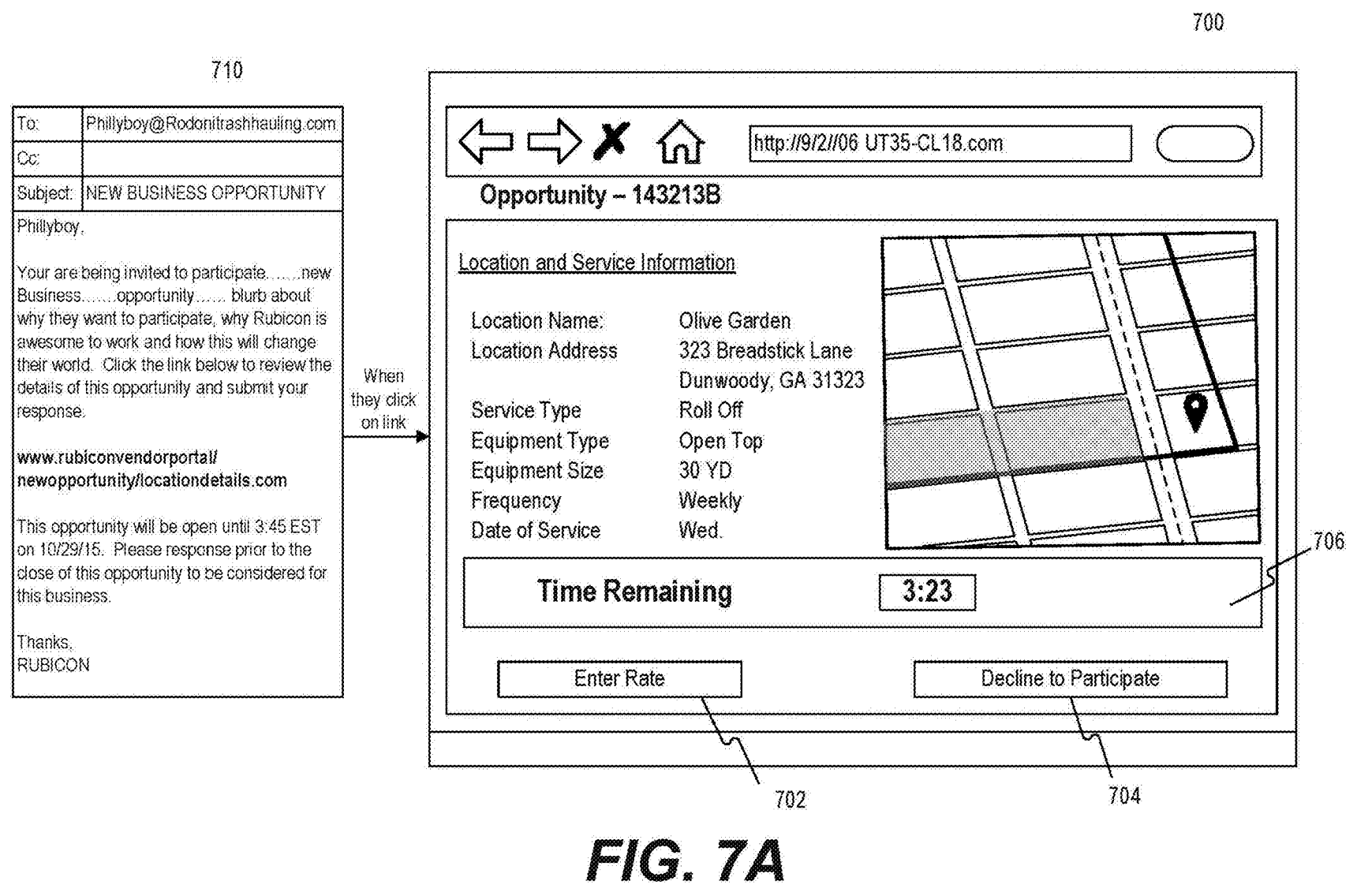

FIG. 7A shows an exemplary GUI 700 that can be used to present an opportunity to a selected vendor. As described above, a vendor may receive an opportunity for fulfilling a service request by way of an e-mail, a text message, or another electronic message. In the embodiment of FIG. 7A, the vendor received an e-mail message 710 providing information regarding the service opportunity and a corresponding link to access additional information and participate in the opportunity awarding process of the disclosed embodiments. Upon selecting the link, the vendor may be presented with GUI 700 providing particular information concerning the available service opportunity. GUI 700 may include a geographical map displaying the location of the particular service opportunity, a type of the service, a type of receptacle 14 at the location, a size of receptacle 14, and a frequency and date of the requested service. Any other information that may be relevant to a vendor for deciding whether to participate in the opportunity awarding process may additionally be presented. As shown, the particular opportunity is available for only a limited time (e.g., for three hours and twenty-three minutes) shown in a countdown area 706. The vendor may elect to participate in the opportunity by selecting an "Enter Rate" button 702 or a "Decline to Participate" button 704.

Figure 7B:

FIG. 7B illustrates an exemplary GUI 700 that may be displayed upon selection of the "Decline to Participate" button 704. As shown in this Figure, a window area 720 may be displayed, enabling the vendor to select a reason for declining to participate in the solicited opportunity. The vendor may select a drop-down menu via a button 722, for example, to select a pre-generated reason for the decline or to enable the vendor to input another reason. Examples of pre-generated reasons may include, "Don't offer the requested service," "Location outside of service area," "No capacity for additional location," "No available equipment," or "Other," etc. The vendor may then submit their reasoning by selecting the "Submit" button. Upon selecting the "Submit" button, the vendor may be presented with a "thank you" for taking the time to respond and encouragement for the vendor to participate in future opportunities. According to some embodiments, the reason that the vendor declined to participate may be used to update the vendor's profile stored within vendor database 56, thereby enabling CPU 32 to better select vendors for presentation of a next similar opportunity.

Figure 7C:
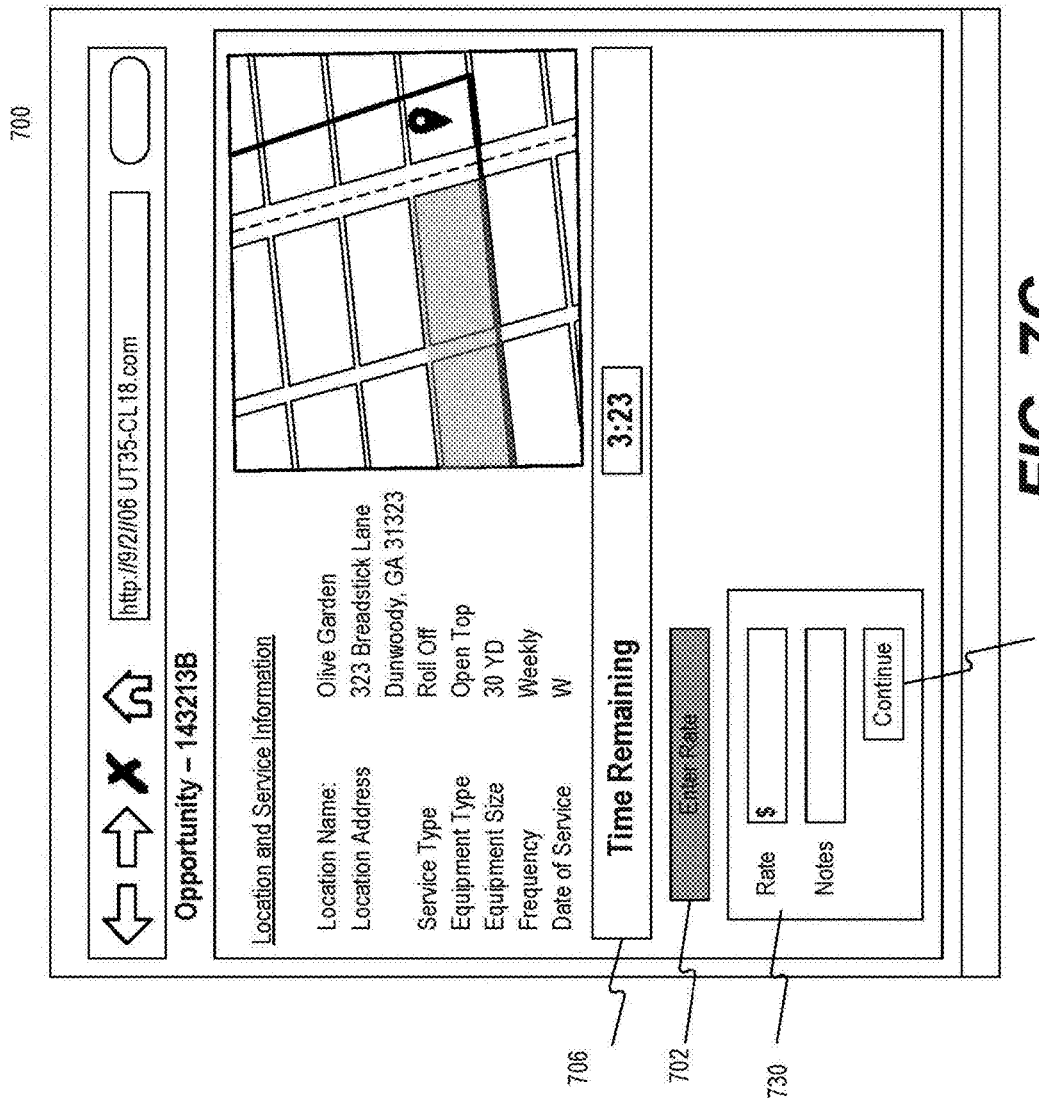

FIG. 7C illustrates an exemplary GUI 700 that may be displayed upon selection of the "Enter Rate" button 702. As shown in this figure, a window area 730 may be provided that enables the vendor to enter a rate quote for the presented opportunity. Window area 730 may also enable the vendor to enter additional notes concerning the rate quote. Upon entering a rate quote and any associated notes, the vendor may select a "Continue" button 732 to proceed with submitting the rate quote. Upon selection of the "Continue" button 732, the vendor may be presented with a GUI 810 or a GUI 820, for example, to login or to create a vendor account if the vendor does not already have an account, respectively. GUI 810 may enable the vendor to input a username and a password, thereby verifying the vendor's identity before accepting the vendor's rate quote. Alternatively GUI 820 enables the vendor to enter a company name, an address, and contact information, and to create a password associated with a new account. Upon selecting the "Submit" button in either GUI 810 or 820, the vendor may be presented with an e-mail 830 or another similar message, thereby confirming the vendor's participation in the service request opportunity process. E-mail 830 may include a link that is selectable by the vendor, allowing the vendor to view the status of a submitted rate quote.

Figure 8:
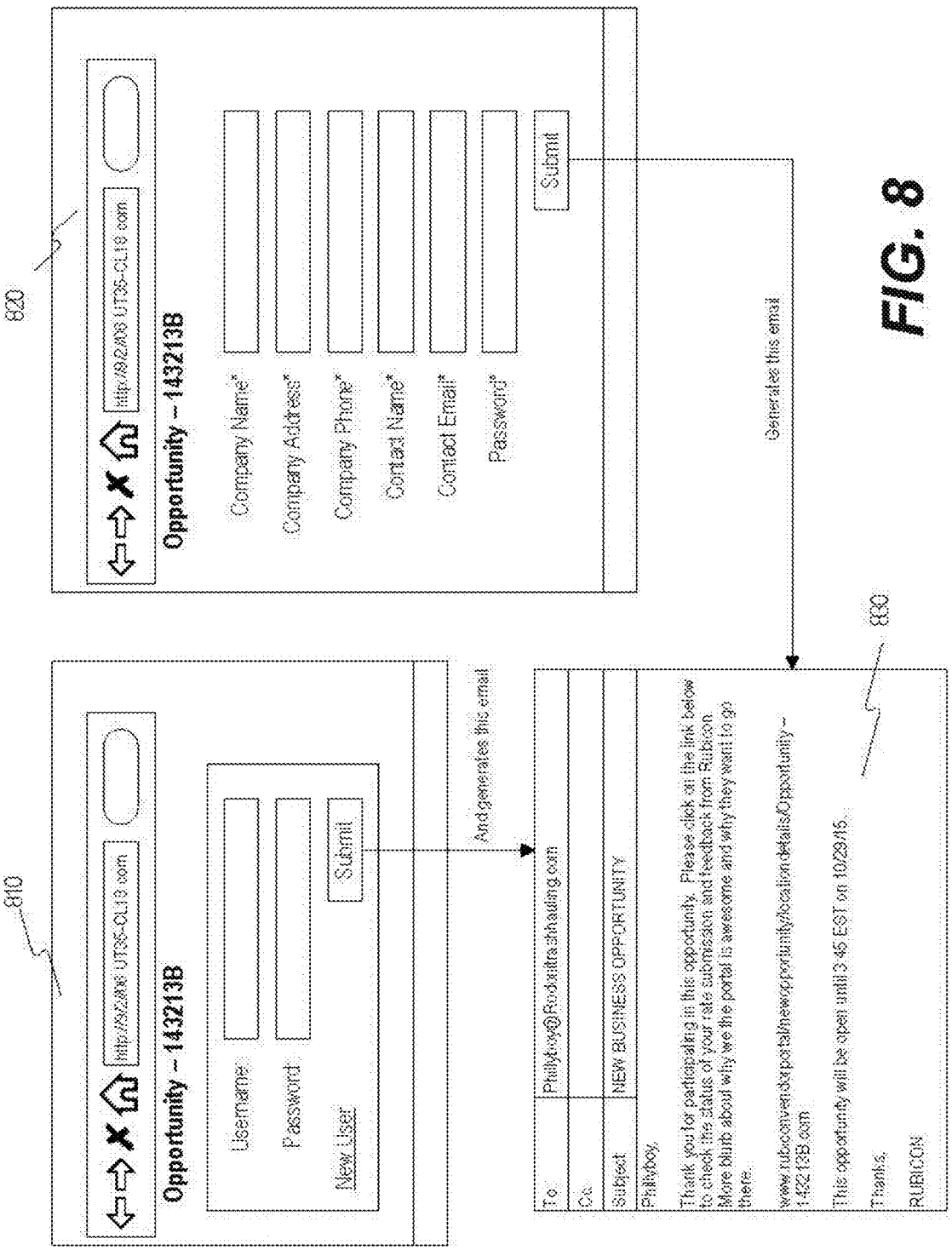
Figure 9:
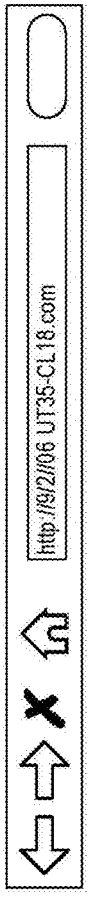

FIG. 9 illustrates an exemplary GUI 900 that may be displayed upon selection of the link in e-mail 830 of FIG. 8. GUI 900 may display a status of the vendor's pending rate quote response to the presented opportunity. As shown in this figure, GUI 900 may include information similar to GUI 700, such as detailed information concerning the presented opportunity. Additionally, GUI 900 may include a window area 902 displaying the status of the vendor's outstanding submitted rate quote. For example, window area 902 may display an "Active" status, indicating that the vendor's response has not yet been acted on. In some embodiments, a rate quote may not be decided on until the time period for responding to the presented opportunity has passed. Other possible status indicators may include: "Awarded", "On Hold", "Declined", etc.

Figure 10:
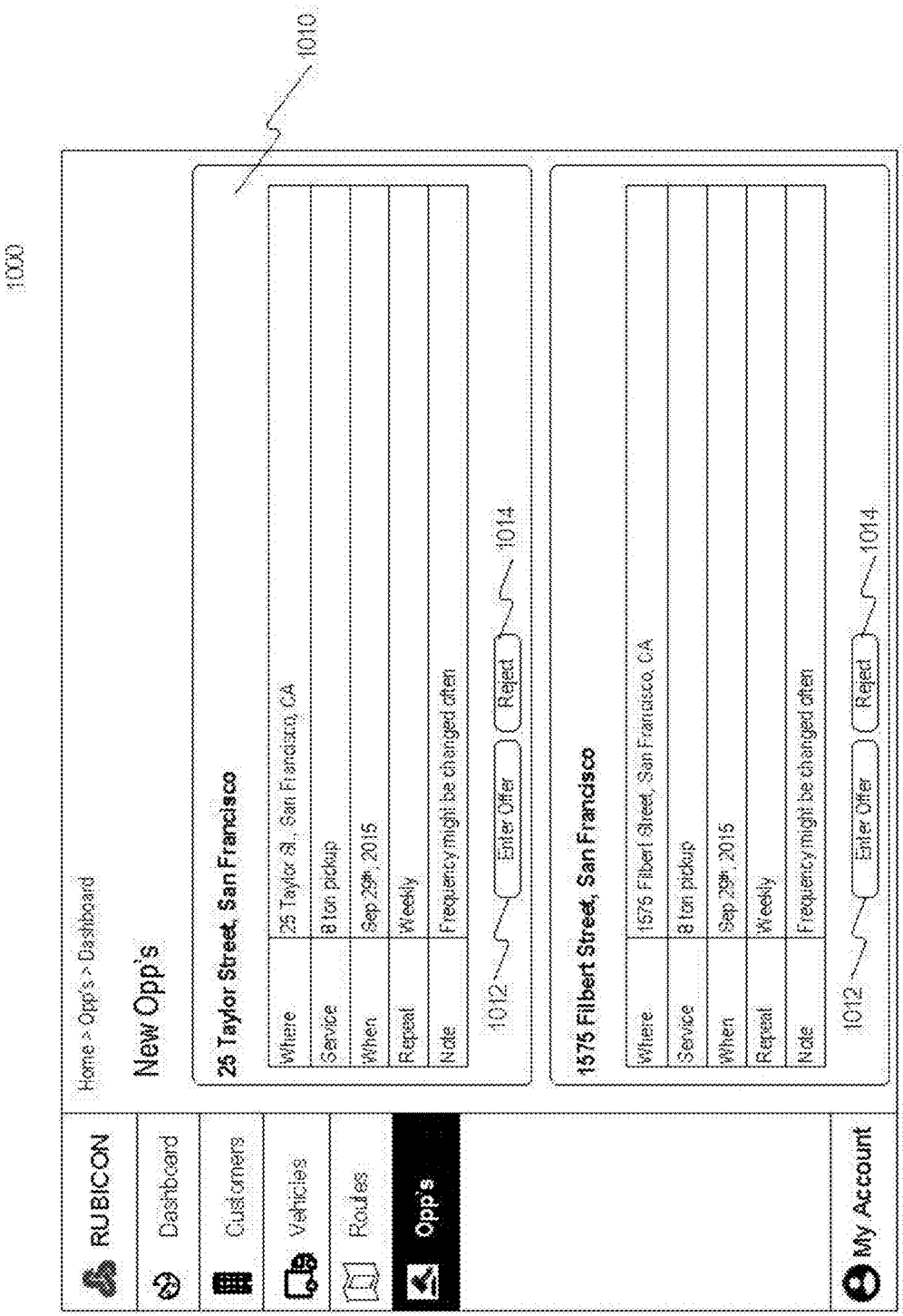

As described above, a vendor may participate in the opportunity awarding process by accessing vendor portal 64. For example, the vendor may be alerted via a text message or e-mail, and prompted to log into vendor portal 64 to access the opportunity information. FIG. 10 illustrates an exemplary GUI 1000 that may be displayed on vendor portal 64 and specially tailored to a particular vendor (e.g., based on vendor identification information entered during the logon process). GUI 1000 includes a window area 1010, for example, providing detailed information concerning one of two new opportunities available to the vendor. As shown in this figure, the vendor may elect to participate in the process by entering an offer through selection of an "Enter Offer" button 1012. Alternatively, the vendor may reject the opportunity upon selection of a "Reject" button 1014.

Figure 11:
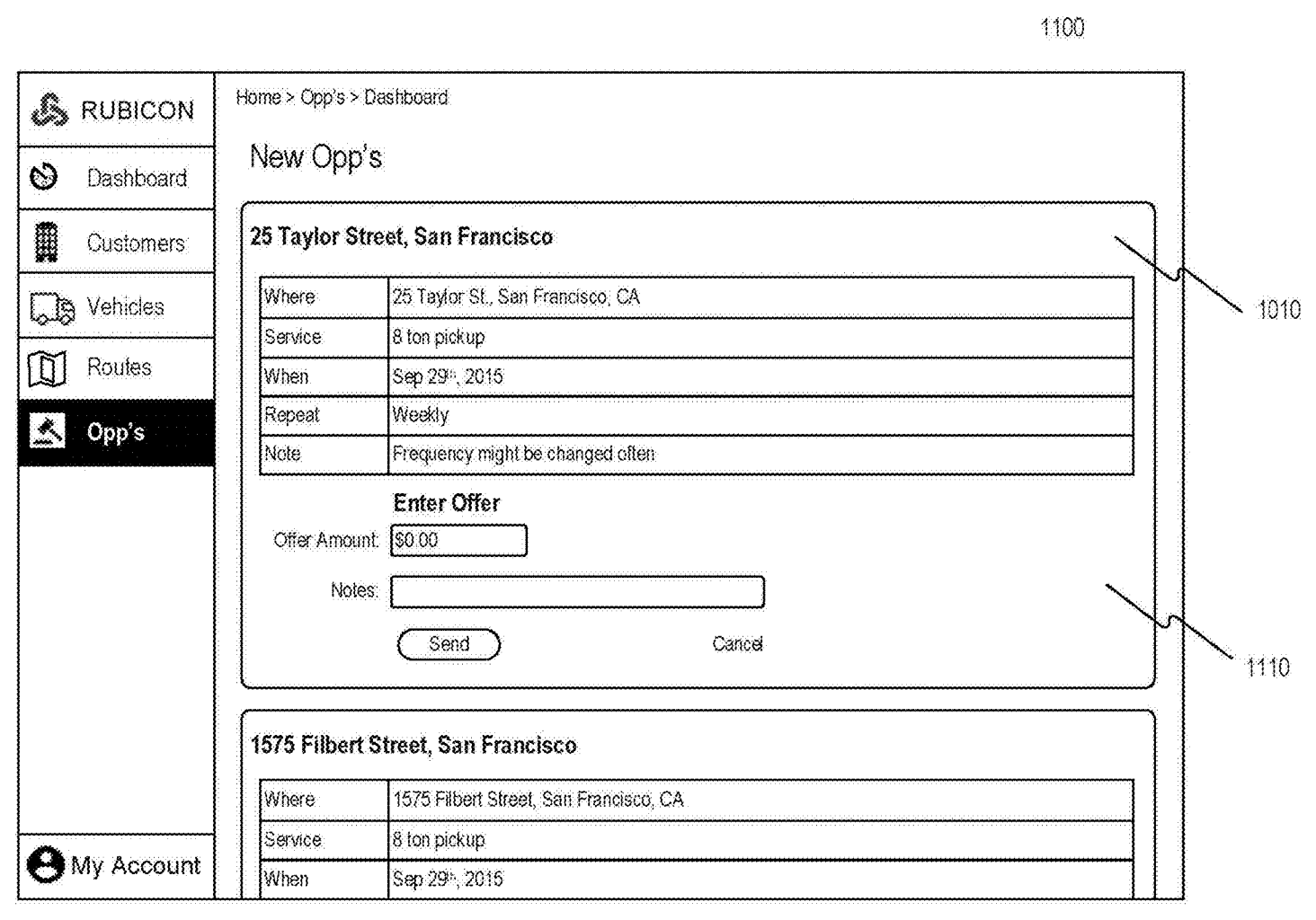

FIG. 11 illustrates an exemplary GUI 1100 that may displayed by vendor portal 64, selection of the "Enter Offer" button 1012 shown in FIG. 10 above. GUI 1100 may include a new window area 1110 that enables the vendor to enter a rate quote/offer amount and any notes pertaining to the vendor's offer. Upon completion of the rate quote, the vendor may submit the offer by selecting a "Send" button.

Figure 12:
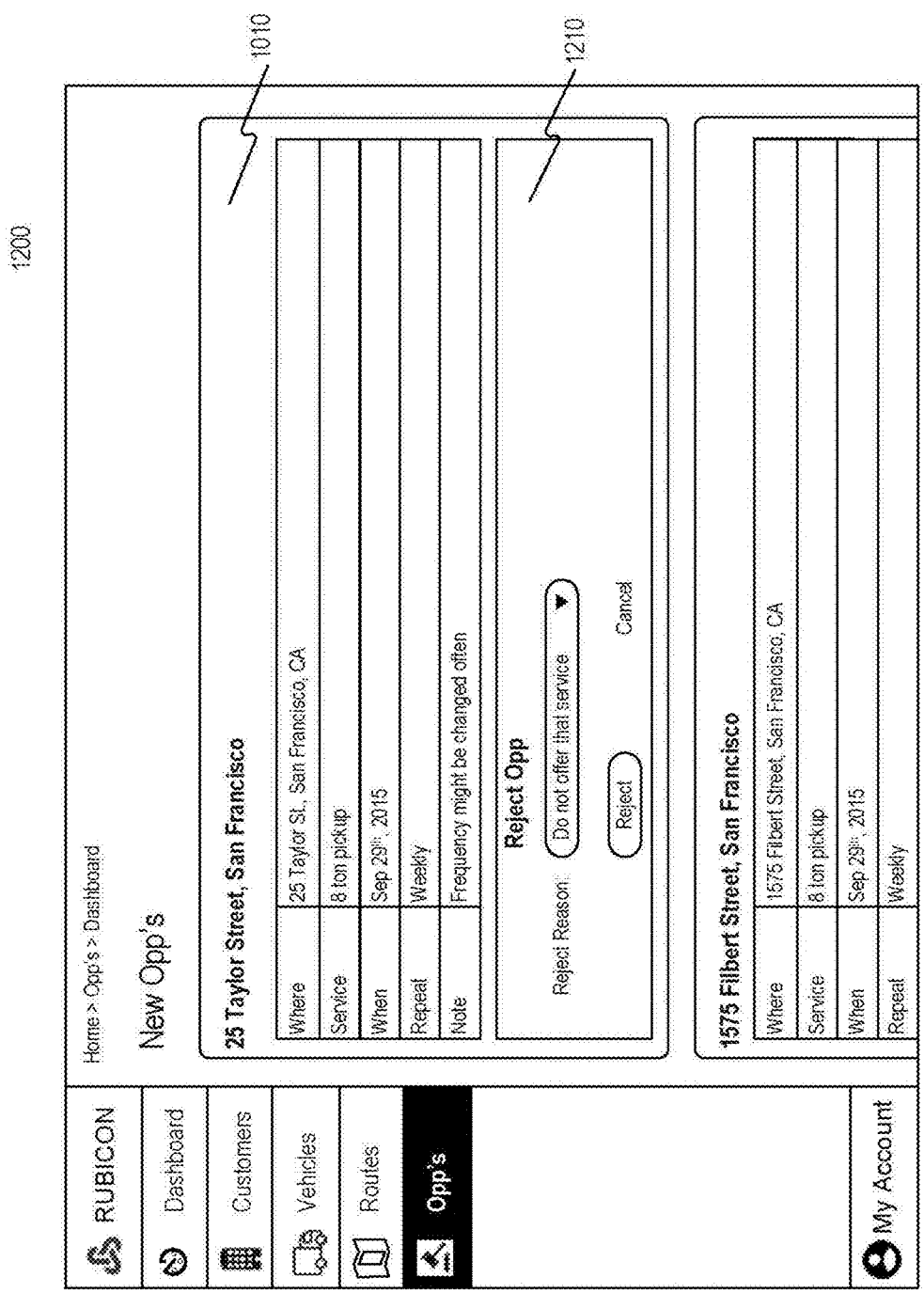

FIG. 12 illustrates an exemplary GUI 1200 that may be displayed by vendor portal 64 upon selection of the "Reject" button 1014 shown in FIG. 10 above. GUI 1200 may include a new window area 1210, which allows the vendor to select a pre-generated reason for rejecting the opportunity, similar to the available options shown in FIG. 7B. Upon selecting a reason for rejecting the opportunity, the vendor may submit the reasoning by selecting the "Reject" button.

Figure 13:
Figure 14:
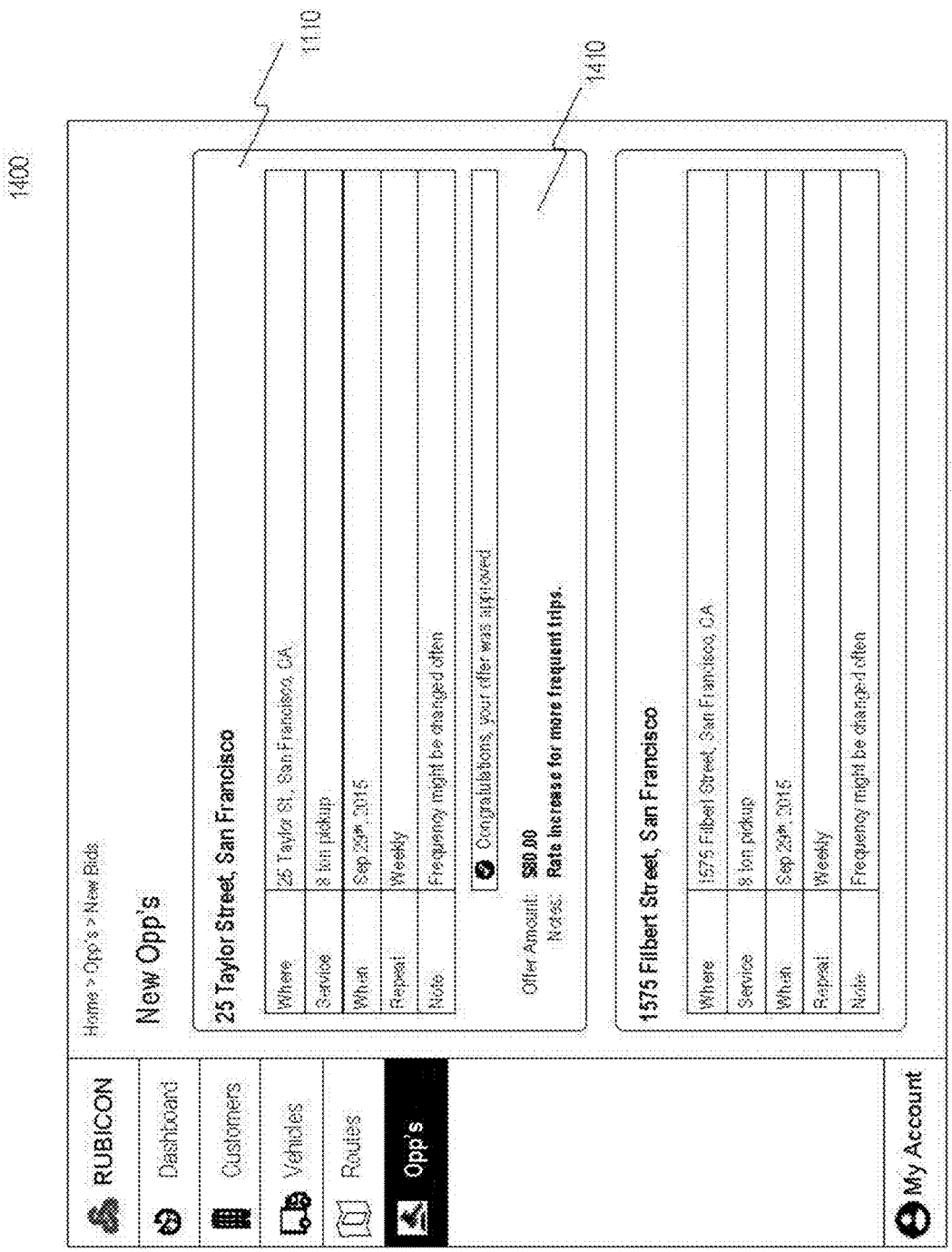
Figure 15:
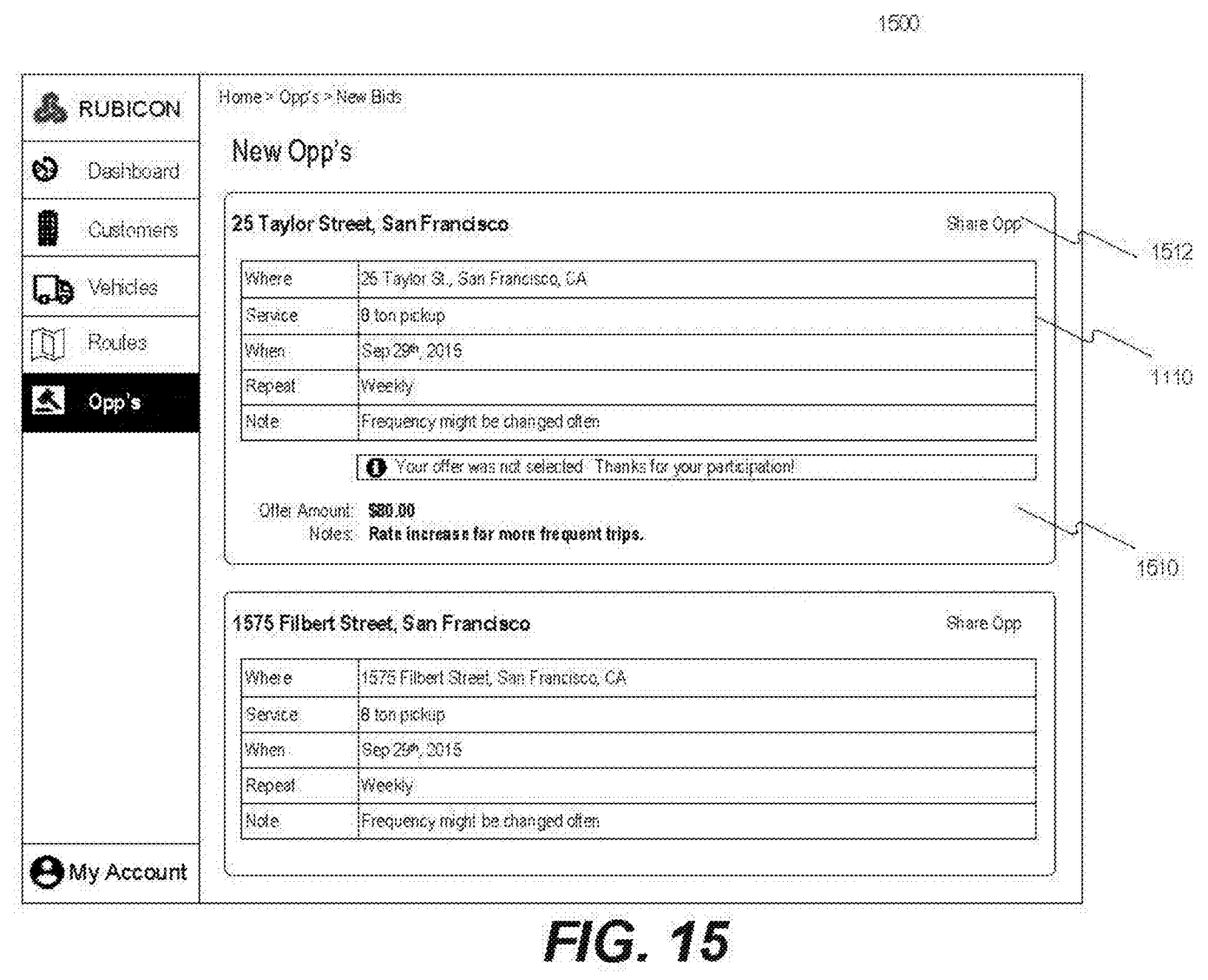

FIGS. 13, 14 and 15 illustrate exemplary GUIs 1300, 1400, and 1500 that may be displayed by vendor portal 64 in response to a vendor entering a rate quote or offer amount via the window area 1110 of FIG. 11. GUI 1300 of FIG. 13 illustrates a window area 1310 that displays a confirmation of the rate quote and other notes or details entered by the vendor via the window area 1110 of FIG. 11. Window area 1310 may be displayed upon selection of the "Send" button shown in FIG. 11. Window area 1310 may include an "Edit" button that allows a vendor to edit or modify the vendor's offer submitted to CPU 32. FIG. 14 illustrates a window area 1410 that may display an updated status of a pending rate quote submitted for an offer. As shown in this Figure, window area 1410 may be updated to display that the offer was approved by CPU 32. Alternatively, a GUI 1500 may be provided that includes a window area 1510 displaying a status message indicating that the vendor's offer was not selected, and thanking the vendor for their participation. In some embodiments, GUI 1500 may provide a selectable option, such as a button 1512, to enable the vendor to share the opportunity with another vendor that may be interested in the opportunity.

Figure 16:
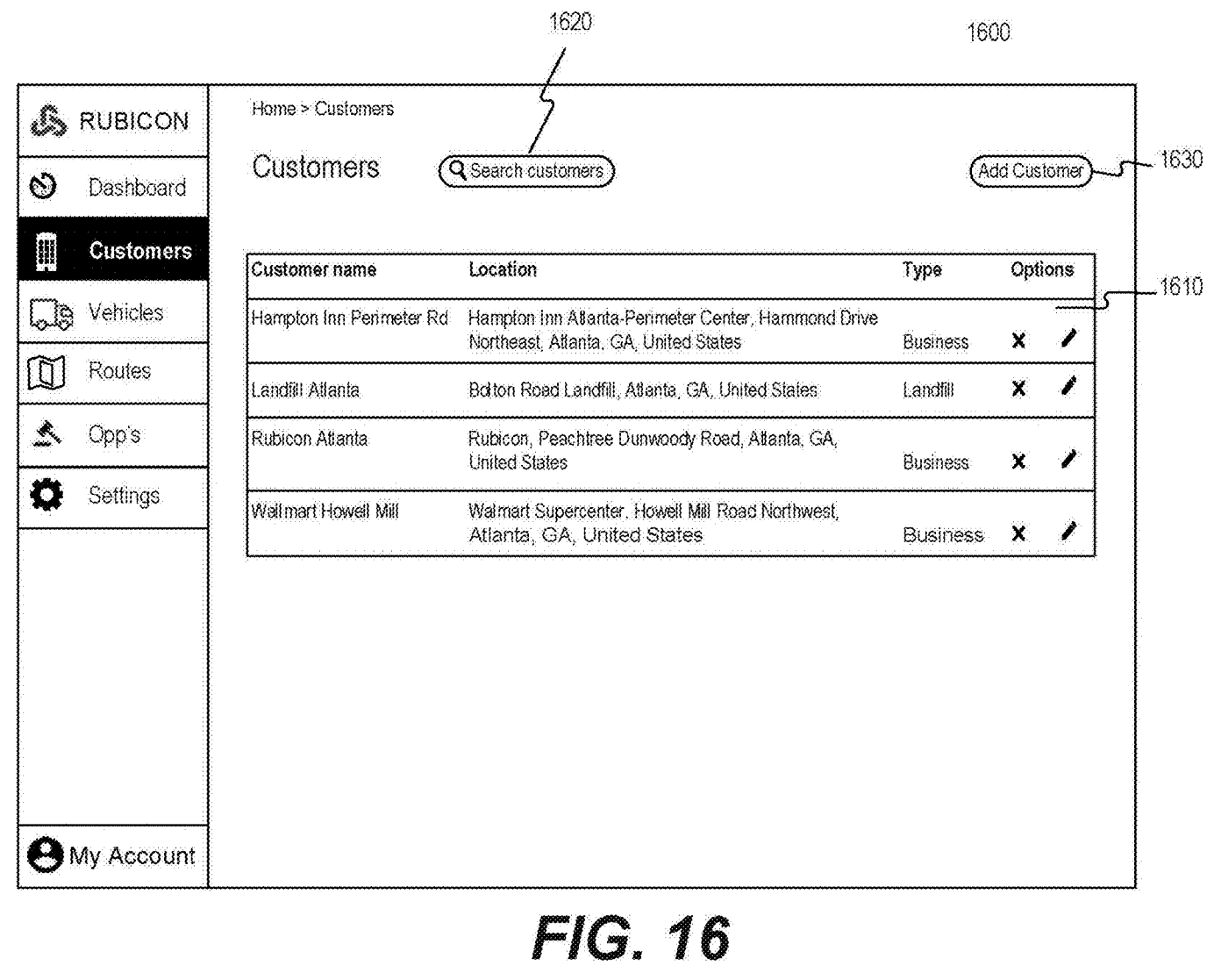

FIGS. 16, 17, and 18 illustrate exemplary GUIs 1600, 1700, and 1800 that may be displayed by administration portal 62. FIG. 16, for example, illustrates a GUI 1600 that may be displayed upon selecting the "Customers" tab on the left-hand menu. GUI 1600 may include a window area 1610 that provides detailed information for a multitude of customers associated with system 46. Any of the customer's information may be selectable to access additional detailed information about the customer. Although FIG. 16 illustrates an administrator view of the customer information, similar information could be similarly presented to a vendor or to a customer in specially tailored GUIs via customer and vendor portals 60, 64, if desired. For example, only the particular customer's name may be displayed in customer portal 60. Under such a view, the customer may be enabled to update or edit any relevant information associated with the particular customer for the provision of waste management services. Additionally, a particular vendor may be able to access via vendor portal 64 additional information for each customer that the particular vendor services. Certain accessible information may pertain to particular details concerning the customer such as special instructions or other information that may be beneficial for the provision of waste management services.

FIG. 17 illustrates a GUI 1700 that may be displayed upon selecting the "Routes" tab on the left-hand menu. As shown in this Figure, GUI 1700 illustrates an example of an edit route function that may be enabled by CPU 32 according to the disclosed embodiments. GUI 1700 includes a window area 1710, which lists a multitude of customer locations and times associated with a route for a particular day and a particular vehicle. The day and vehicle may be changed by updating a date field 1712 and selecting a vehicle from a drop-down menu 1714, respectively. The route may be managed by adding a location via a selectable option 1716, for example. The route may also be managed by removing or rearranging a customer location from the listed stops along the route.

FIG. 18 illustrates another exemplary GUI 1800 that may be displayed by system 46. GUI 1800 may include a window area 1810 having a multitude of selectable tabs, each associated with unassigned, scheduled, or completed stops, as well as a tab to view or report problems/reports associated with a particular stop. GUI 1800 may be displayed for example, upon a user selection of an identifier in window section 420 of FIG. 4. Window area 1810 may display information pertaining to completed stops of a particular route, and include vendor, vehicle and customer associated with a particular stop. Additional details pertaining to the stop may be obtained by selecting information associated with the stop or by choosing a selectable button "View." From this view, a vendor or administrator, for example, may be enabled to prepare a report to provide notification of an issue associated with the selected stop, by selecting the displayed "Report" button.

The interfaces illustrated in FIGS. 4-18 are exemplary only and are provided to highlight certain aspects of the disclosed portals. Other views and functionality are contemplated, as would be understood by one of skill in the art. It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

The disclosed system may be simple, easy to use, efficient, and accurate. In particular, because many of the functional aspects of the disclosed system may be automated, the burden placed on the user and the time associated with using the disclosed system may be reduced. In addition, because the disclosed system may seamlessly connect customers to only screened and qualified vendors, the selection process may be highly effective, with little chance for error.

What is claimed is:

1. A computer-implemented method for tracking and scheduling services using a distributed system, comprising:
    collecting, by a plurality of distributed processors, information about vehicle movements and associated changes made to environments using a plurality of on-board vehicle sensors connected to an on-board vehicle controller, the plurality of on-board vehicle sensors including a first location sensor and a first performance sensor, each on-board vehicle controller configured to transmit a plurality of signals to a cloud-based electronic network, the information including a location of the respective vehicle, a travel path of the respective vehicle, and data from the plurality of on-board vehicle sensors;
    wherein the location and travel path of the respective vehicle is tracked by the plurality of distributed processors based on triangulating a relative 3-D geographic position and orientation of each vehicle relative to a reference point using a respective location sensor;
    filtering and aggregating, by the plurality of distributed processors, the plurality of signals using the cloud-based electronic network, the cloud-based electronic network including the plurality of distributed processors;
    storing, by one or more processors of the plurality of distributed processors, the plurality of signals in a first database;
    receiving, by one or more processors of the plurality of distributed processors, a query for a service request from a first user device, the service request including a location, time, and type of service;
    submitting the query to the first database;
    determining, by the plurality of distributed processors, service provider ranking criteria based on the plurality of signals stored in the first database, including at least one of service performance, service capability, and service provider relationship;
    filtering and ranking, by the plurality of distributed processors, a list of service providers based on the service provider ranking criteria via a first processor of the plurality of distributed processors;
    transmitting, by one or more processors of the plurality of distributed processors, a message to a first service provider including a link, wherein activation of the link includes an availability to accept or reject a first service corresponding to the service request; and
    in response to receiving acceptance of the first service, transmitting, by one or more processors of the plurality of distributed processors, instructions to the first service provider, the instructions directing the first service provider to a customer location to perform the first service.

2. The computer-implemented method of claim 1, wherein the on-board vehicle sensors are configured to detect an amount of waste inside one or more waste receptacles.

3. The computer-implemented method of claim 1, wherein each on-board vehicle controller is configured to rank service providers based on the communicated information related to the service request.

4. The computer-implemented method of claim 1, wherein a first on-board vehicle controller is configured to provide real-time feedback in response to the service request.

5. The computer-implemented method of claim 1, further comprising an input device configured to allow an administrator to provide input regarding the service request and the first service.

6. The computer-implemented method of claim 5, further comprising causing graphical user interface (GUI) to be shown on a first input device, the GUI providing at least one of a count of each vehicle currently operating, statistics associated with stops made by each vehicle, information regarding outstanding customer service opportunities, routes followed by each vehicle, and the first service.

7. The computer-implemented method of claim 1, further comprising receiving input via an input device regarding manual selection of a particular vendor from a shorter list of vendors; and
selectively offering the first service only to the particular vendor on the shorter list of vendors based on the input.

8. The computer-implemented method of claim 7, further comprising providing a time window in which the particular vendor from the shorter list of vendors is allowed to accept the first service.

9. The computer-implemented method of claim 1, further comprising receiving a rate quote associated with acceptance of the first service; and
awarding the first service to a particular vendor from the shorter list of vendors based on the acceptance and the rate quote.

10. A system for tracking and scheduling services using a plurality of distributed processors, comprising:
a non-transitory memory;
a plurality of distributed processors coupled to the non-transitory memory and configured to execute instructions to perform operations comprising:
collecting information about vehicle movements and associated changes made to environments using a plurality of on-board vehicle sensors connected to an on-board vehicle controller, the plurality of on-board vehicle sensors including a first location sensor and a first performance sensor, each on-board vehicle controller configured to transmit a plurality of signals to a cloud-based electronic network, the information including a location of the respective vehicle, a travel path of the respective vehicle, and data from the plurality of on-board vehicle sensors;
wherein the location and travel path of the respective vehicle is tracked based on triangulating a relative 3-D geographic position and orientation of each vehicle relative to a reference point using a respective location sensor;
filtering and aggregating the plurality of signals using the cloud-based electronic network, the cloud-based electronic network including the plurality of distributed processors;
storing the signals in a first database;
receiving a query for a service request from a first user device, the service request including a location, time, and type of service;
submitting the query to the first database;
determining service provider ranking criteria based on the signals stored in the first database, including at least one of service performance, service capability, and service provider relationship;
filtering and ranking a list of service providers based on the service provider ranking criteria via a first processor of the plurality of distributed processors;
transmitting a message to a first service provider including a link, wherein activation of the link includes an availability to accept or reject a first service corresponding to the service request; and
in response to receiving acceptance of the first service, transmitting instructions to the first service provider, the instructions directing the first service provider to a customer location to perform the first service.

11. The system of claim 10, wherein the on-board vehicle sensors are configured to detect an amount of waste inside one or more waste receptacles.

12. The system of claim 10, wherein each on-board vehicle controller is configured to rank service providers based on the communicated information related to the service request.

13. The system of claim 10, wherein a first on-board vehicle controller is configured to provide real-time feedback in response to the service request.

14. The system of claim 10, further comprising an input device configured to allow an administrator to provide input regarding the service request and the first service.

15. The system of claim 14, further comprising causing graphical user interface (GUI) to be shown on a first input device, the GUI providing at least one of a count of each vehicle currently operating, statistics associated with stops made by each vehicle, information regarding outstanding customer service opportunities, routes followed by each vehicle, and the first service.

16. The system of claim 10, further comprising receiving input via an input device regarding manual selection of a particular vendor from a shorter list of vendors; and
selectively offering the first service only to the particular vendor on the shorter list of vendors based on the input.

17. The system of claim 16, further comprising providing a time window in which the particular vendor from the shorter list of vendors is allowed to accept the first service.

18. The system of claim 17, further comprising receiving a rate quote associated with acceptance of the first service; and
awarding the first service to a particular vendor from the shorter list of vendors based on the acceptance and the rate quote.

19. A non-transitory computer-readable medium including computer-executable programming instructions for tracking and scheduling services using a plurality of distributed processors, the method comprising:
collecting information about vehicle movements and associated changes made to environments using a plurality of on-board vehicle sensors connected to an on-board vehicle controller, the plurality of on-board vehicle sensors including a first location sensor and a first performance sensor selected from the group consisting of a load cell, a force gauge, and a pressure sensor; each on-board vehicle controller configured to transmit a plurality of signals to a cloud-based electronic network, the information including a location of the respective vehicle, a travel path of the respective vehicle, and data from the plurality of on-board vehicle sensors;
wherein:
the location and travel path of the respective vehicle is tracked based on triangulating a relative 3-D geographic position and orientation of each vehicle relative to a reference point using a respective location sensor; and
the plurality of on-board sensors further includes an optical sensor utilized to determine characteristics of waste material inside receptacles;
filtering and aggregating the plurality of signals using the cloud-based electronic network, the cloud-based electronic network including the plurality of distributed processors;
storing the signals in a first database;
receiving a query for a service request from a first user device, the service request including a location, time, and type of service;
submitting the query to the first database;

determining service provider ranking criteria based on the signals stored in the first database, including at least one of service performance, service capability, and service provider relationship;

filtering and ranking a list of service providers based on the service provider ranking criteria via a first processor of the plurality of distributed processors;

transmitting a message to a first service provider including a link, wherein activation of the link includes an availability to accept or reject a first service corresponding to the service request; and in response to receiving acceptance of the first service, transmitting instructions to the first service provider, the instructions directing the first service provider to a customer location to perform the first service.

* * * * *